United States Patent
Kawamura

(10) Patent No.: US 7,149,475 B2
(45) Date of Patent: Dec. 12, 2006

(54) WIRELESS COMMUNICATION CONTROL APPARATUS AND METHOD, STORAGE MEDIUM AND PROGRAM

(75) Inventor: Harumi Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 10/362,481

(22) PCT Filed: Jun. 25, 2002

(86) PCT No.: PCT/JP02/06322
§ 371 (c)(1),
(2), (4) Date: Aug. 4, 2003

(87) PCT Pub. No.: WO03/003659

PCT Pub. Date: Jan. 9, 2003

(65) Prior Publication Data
US 2004/0048569 A1    Mar. 11, 2004

(30) Foreign Application Priority Data
Jun. 27, 2001    (JP) .............................. 2001-194137

(51) Int. Cl.
*H04B 7/00*    (2006.01)
(52) U.S. Cl. ..................................... 455/41.2; 370/338
(58) Field of Classification Search ...... 455/41.1–41.3; 370/338
See application file for complete search history.

(56) References Cited

U.S. PATENT DOCUMENTS 6,879,570 B1 *    4/2005    Choi .......................... 370/329

FOREIGN PATENT DOCUMENTS

| EP | 1 089 499 | 4/2001 |
| JP | 2001-144765 | 5/2001 |
| JP | 2001-168881 | 6/2001 |
| JP | 2001-313650 | 11/2001 |

* cited by examiner

*Primary Examiner*—Lee Nguyen
(74) *Attorney, Agent, or Firm*—Finnegan, Henderson, Farabow, Garrett & Dunner, L.L.P.

(57) ABSTRACT

By making the most of the master and slave roles, the master device becomes the system controller to manage the control functions of the slave devices in a piconet. For one slave device to control another slave device, the controlling slave device issues a command to the master device, which transfers the received command to the controlled slave device. Each slave device control other slave devices in a piconet without being aware of other slave devices except the master device. Consequently, commands may be exchanged between the slave devices in a piconet which is constituted by one master device and a plurality of slave devices.

16 Claims, 22 Drawing Sheets

F I G. 1 4
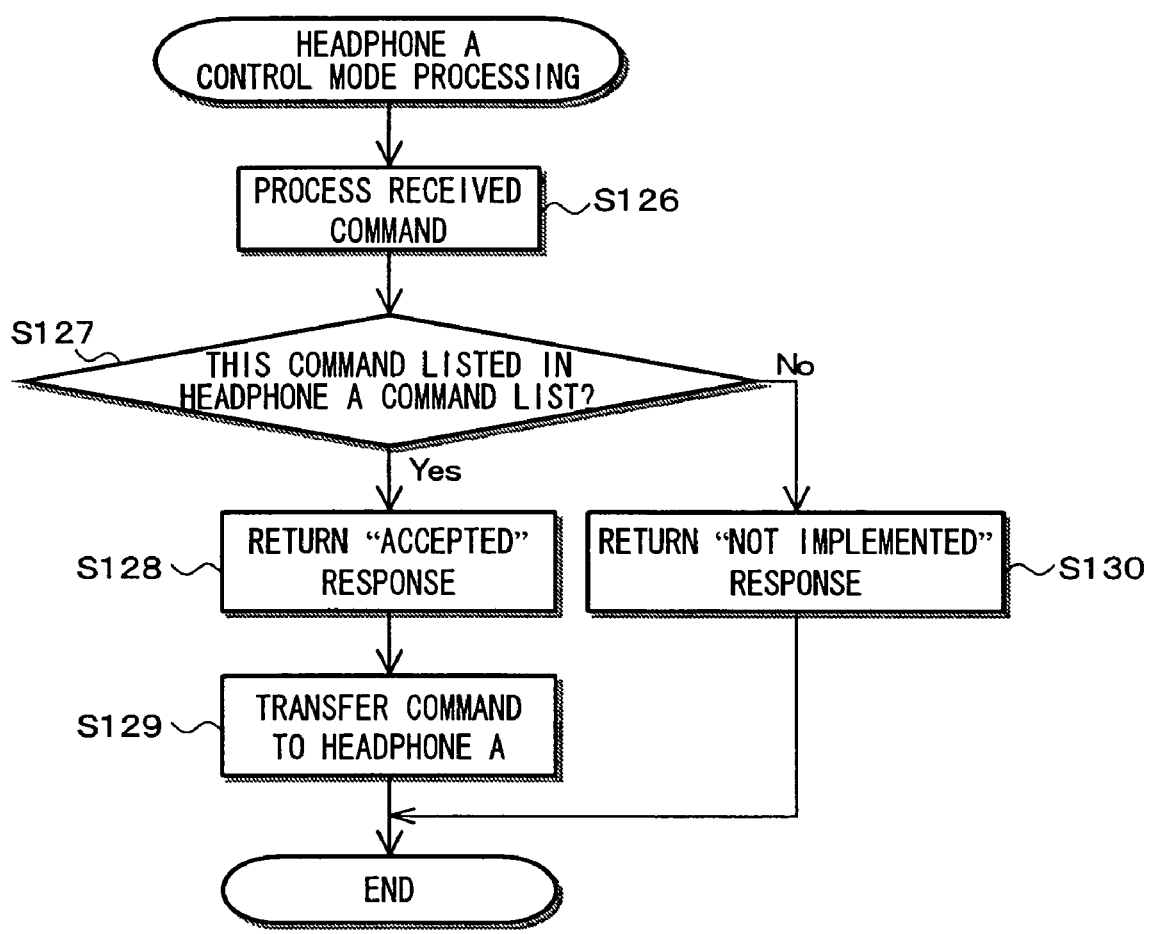

| ctype/response | Subunit_type | Subunit_ID | Opcode | Operand |
|---|---|---|---|---|
| Specific Inquiry | Panel subunit | 0 | PASS THROUGH | Operation_id (volume up) |

| ctype/response | Subunit_type | Subunit_ID | Opcode | Operand |
|---|---|---|---|---|
| Implemented | Panel subunit | 0 | PASS THROUGH | Operation_id (volume up) |

F I G. 2 3

| ctype/response | Subunit_type | Subunit_ID | Opcode | Operand |
|---|---|---|---|---|
| Specific Inquiry | Panel subunit | 0 | PASS THROUGH | Operation_id (input select) |

F I G. 2 4

| ctype/response | Subunit_type | Subunit_ID | Opcode | Operand |
|---|---|---|---|---|
| No Implemented | Panel subunit | 0 | PASS THROUGH | Operation_id (input select) |

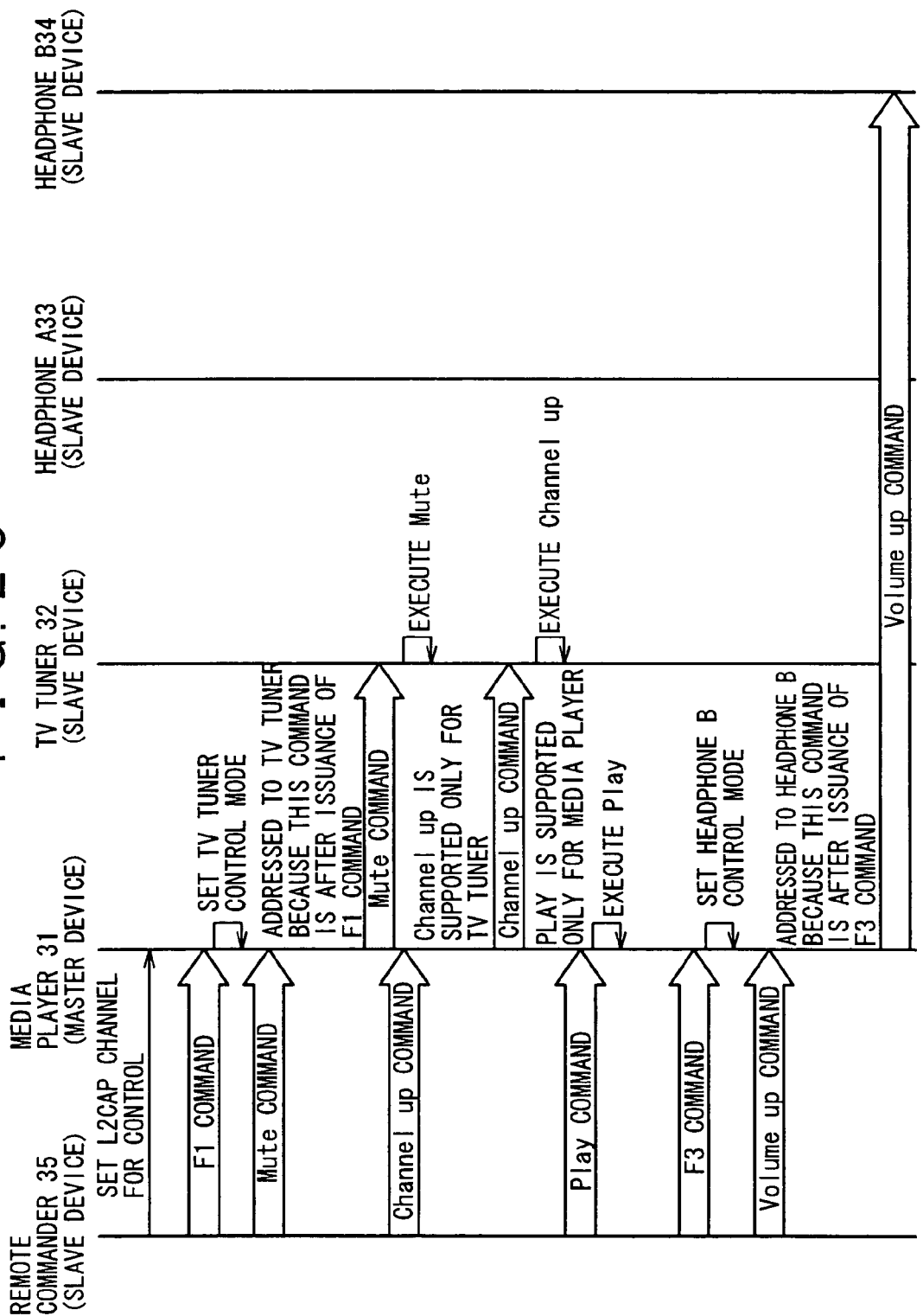

| ctype/response | Subunit_type | Subunit_ID | Opcode | Operand |
|---|---|---|---|---|
| Control | Panel subunit | 0 | PASS THROUGH | Operation_id (F1) |

| ctype/response | Subunit_type | Subunit_ID | Opcode | Operand |
|---|---|---|---|---|
| Accepted | Panel subunit | 0 | PASS THROUGH | Operation_id (F1) |

FIG. 29

| ctype/response | Subunit_type | Subunit_ID | Opcode | Operand |
|---|---|---|---|---|
| Control | Panel subunit | 0 | PASS THROUGH | Operation_id (Mute) |

FIG. 30

| ctype/response | Subunit_type | Subunit_ID | Opcode | Operand |
|---|---|---|---|---|
| Accepted | Panel subunit | 0 | PASS THROUGH | Operation_id (Mute) |

FIG. 31

| ctype/response | Subunit_type | Subunit_ID | Opcode | Operand |
|---|---|---|---|---|
| Control | Panel subunit | 0 | PASS THROUGH | Operation_id (Mute) |

FIG. 32

| ctype/response | Subunit_type | Subunit_ID | Opcode | Operand |
|---|---|---|---|---|
| Accepted | Panel subunit | 0 | PASS THROUGH | Operation_id (Mute) |

WIRELESS COMMUNICATION CONTROL APPARATUS AND METHOD, STORAGE MEDIUM AND PROGRAM

TECHNICAL FIELD

The present invention relates generally to a wireless communication control apparatus, a wireless communication control method, a storage medium, and a program for interconnecting a plurality of devices in a wireless manner and, more particularly, to a wireless communication control apparatus, a wireless communication control method, a storage medium, and a program for controlling the exchange of device operating commands between the devices interconnected in a wireless manner within a predetermined communication cell.

To be more specific, the present invention relates to a wireless communication control apparatus, a wireless communication control method, a storage medium, and a program for exchanging device operating commands between the devices within a piconet constituted by one master device and a plurality of slave devices as with implemented by the Bluetooth™ standard and, more particularly, to a wireless communication control apparatus, a wireless communication control method, a storage medium, and a program for controlling the exchanging of device operating commands between the two or more slave devices which are directly connected only to the master device within a piconet.

BACKGROUND ART

Recently, short-distance wireless communication technologies have come before the footlights. The wireless communicating based on these communication technologies can establish the cordless communication between devices and terminals, thereby simplifying the device connection work and, at the same time, enhancing convenience because it is substantially unnecessary to select installation spaces of the cordlessly connected devices. The short-distance wireless communication is expected a great deal also as the transmission media for home networks for example, in which it not realistic to lay network cables because of their locality.

The short-distance wireless communication may be used, for example, not only for the data transfer between a computer main frame and its peripheral devices, but also for the data exchange between mobile information devices, and data and audio transmission between a telephone main body, a mobile music player, and a headset, and between a main phone and its cordless headset.

Bluetooth, which is a representative example of short-distance wireless communication, is the standard for providing a wireless connection interface applicable to a variety of industries and operated and managed by the Bluetooth SIG (Special Interest Group).

Bluetooth uses a global radio frequency called ISM (Industry Science Medical) band of 2.4 GHz and provides a total data transfer rate of 1 Mbps, in which a synchronous transmission channel of 64 Kbps available for telephone voice transmission and an asynchronous transmission channel for data transmission are provided. For the synchronous transmission channel, SCO (Synchronous Connection Oriented Link) transmitting is used for the application to line linking. For the asynchronous transmission channel, ACL (Asynchronous Connection Less Link) transmitting is used for the application to the data transmission based on packet exchange. The connection range of interconnected devices based on Bluetooth is about 10 meters, which can be extended to 100 meters with the aid of an additional amplifier.

The technical specifications of Bluetooth are largely divided into the core and the profile. The core defines the base of the wireless connection provided by the Bluetooth, while the profile, in developing a variety of functions and applications on the basis of the Bluetooth core and assembling them into equipment, is a collection of the technical requirements specified for each function to guarantee the mutual connectivity between the devices.

There are two or more Bluetooth profiles and, by combining them, one application (also called a usage model (or usage) is provided. Actually, a combination of profiles providing an application is implemented in each Bluetooth product.

For example, a variety of Bluetooth profiles are supposed, such as the profiles for automobiles, networks, printers, audio devices, and video devices in addition to the profiles for mobile phones and personal computers, for example. For example, for a profile for remote commander control for audio visual (AV) equipment, "Bluetooth AV Remote Control Profile" (AVRCP) may be mentioned.

Originally, Bluetooth is a wireless communication technology for providing interconnection between mobile terminals; but, obviously, this technology is also designed for the application to stationary equipment. For example, the wireless connection based on Bluetooth may be applied to the connection between a main phone and its cordless handset, a mobile music player and its headset, or a stereo unit (or other media players) and its speakers (or other output devices such as display monitors).

Application of the wireless communication based on Bluetooth to the interconnection of devices solves the problems of the connector-unique shapes and characteristics obliged at cable connection. In addition, because Bluetooth is a worldwide standard using a global wireless frequency band called ISM (Industry Science Medical) band of 2.4 GHz, the globalization of communication environments may be promoted with ease.

Bluetooth provides not only one-to-one alternate connection, but also the construction of one-to-many simplified wireless networks. Hence, the order of communication is maintained by giving the control capabilities to one of the devices interconnected in a Bluetooth communication environment. The device given with the control capabilities is called a "maser device," while the other devices are called "slave devices." A network in which the master device and the slave devices are in a communication state is called a "piconet."

Within a piconet, "piconet synchronization" is provided, in which each Bluetooth device in the communication state has the same frequency hopping pattern and a time slot with reference to the master device. The time slot is formed by each device with reference to the Bluetooth clock provided by the master device.

Within a piconet, one master device always exists and this master device carries out communication by controlling its slave devices. In addition, within a piconet, each packet is received only between the master devices and each slave device, so that the slave devices cannot directly communicate with each other.

The maximum number of slaves which can communicate with each other within one piconet is specified to be seven.

The maximum of one master device and the seven slave devices can constitute Bluetooth communication environment in one piconet.

In the Bluetooth communication, there is a demand for executing device control between the slave devices. For example, if the Bluetooth communication is introduced in the field of audio visual (AV) equipment, a stereo unit or a media player may be defined as a master device, while a TV receiver and a headphone as output targets or a remote commander for remotely operating these output devices may be defined slave devices. Within the Bluetooth piconet like this, it would be meaningless for the user if the stereo unit, the master device, cannot control the targets such as a TV receiver and a headphone and, in addition, the remote controller, a slave device, cannot performing TV tuning and volume setting or headphone volume setting for example. However, as described above, these direct communication between the slave devices is not supported by Bluetooth.

For example, there is "AV Remote Control Profile" (AVRCP) for one of the Bluetooth-compatible AV device control profiles. However, because Bluetooth can originally execute communication by constituting one piconet by one master device and two or more slave devices, this AVRCP control profile is intended to realize one-to-one communication between the master device and one slave device.

In order for a remote commander, a slave device, to control another slave device via the master device, a method may be used in which a mechanisms for realizing this configuration is newly defined to implement it as a new control profile. However, if control is implemented in which a slave device controls another slave device via the master device by use of the new control profile, this method cannot be applied to the existing devices based on only AV Remote Control Profile control.

DISCLOSURE OF INVENTION

It is therefore an object of the present invention to an excellent wireless communication apparatus, an excellent wireless communication method, an excellent storage medium and an excellent program which are capable of preferably exchanging device operating commands between devices interconnected in a wireless manner.

It is another object of the present invention to provide an excellent wireless communication apparatus, an excellent wireless communication method, an excellent storage medium and an excellent program which are capable of preferably exchanging device operating commands between the devices within a piconet constituted by one master device and a plurality of slave devices as that based on Bluetooth.

It is still another object of the present invention to provide an excellent wireless communication apparatus, an excellent wireless communication method, an excellent storage medium and an excellent program which are capable of preferably exchanging device operating commands between two or more slave devices which are directly connected only to the master device in a piconet.

It is yet another object of the present invention to provide an excellent wireless communication apparatus, an excellent wireless communication method, an excellent storage medium and an excellent program which are capable of preferably performing remote control between the slave devices within the same piconet by use of the remote control profile based on Bluetooth.

It is a different object of the present invention to provide an excellent wireless communication apparatus, an excellent wireless communication method, an excellent storage medium and an excellent program are capable of realizing the remote control by one slave device of another slave device via the master device within the piconet by use of a conventional Bluetooth control profile such as AV Remote Control Profile.

In carrying out the invention and according to a first aspect thereof, there is provided a wireless communication control apparatus or a wireless communication control method for controlling command exchange between devices in a communication cell constituted by one master device and a plurality of slave devices, each slave device being capable of communicating with only the master device including the steps of: inquiring each device in the communication cell whether each device operates as a controller or a target; inquiring each device having a target function for a command supported thereby; and managing the commands supported by each target device.

In the communication cell to which the wireless communication control apparatus and the wireless communication control method associated with the first aspect of the invention, each slave device is communicable only with the master device and, on a predetermined control profile, the master device and each slave device may operate as a controller for issuing commands and/or a target for supporting commands.

The communication cell to which the wireless communication control apparatus and the wireless communication control method associated with the first aspect of the invention may be applied to a device which becomes the master in the above-mentioned communication cell to preferably yield the effects of the invention. The master device itself functions as both controller and target on a predetermined profile. The above-mentioned support command managing means or step manages the support commands of the master device itself.

According to the wireless communication control apparatus and the wireless communication control method associated with the first aspect of the invention, the master device becomes the system controller to manage the control function namely the support commands of each slave device operating as a target in the communication cell. For one slave device operating as the controller in the communication cell to control another slave device, the controlling slave device issues commands with this master device as a target. The master device which is the controller may transfer commands to the target which supports the commands, namely this another slave device.

Consequently, if each slave device functions as the controller on a predetermined profile, one slave device may issue commands to any target in the communication cell without being aware of the existence of the other devices than the master device. Likewise, each slave device operating as a target on a predetermined profile may only execute the commands transmitted from the master device without being aware of the other devices other than the master device (namely, without being aware of whether each received command is from another slave device which functions as the controller).

In other words, the slave device operating as the controller transmits commands to the master device as a target and the other slave devices operating as targets may only process the commands received from the master device. Namely, according to the wireless communication control apparatus and the wireless communication control method associated with the first aspect of the invention, control between the slave devices is realized via the master device in the communication cell in which each slave devices is communicable only with the master device.

The wireless communication control apparatus and the wireless communication control method associated with the first aspect of the invention of the invention may also include the means or step for receiving commands from the controller in the above-mentioned communication cell and the means and step for processing the received commands.

The command processing means or step inquires the above-mentioned support command managing means to transfer the received commands to the targets which support these commands.

In addition, the above-mentioned command processing means or step inquires the above-mentioned support command managing means to cause the master device itself to execute the received commands if these commands are supported by the master device in which the wireless communication control apparatus or the wireless communication control method associated with the first aspect of the invention is implemented.

If there are two or more targets which support the received commands in the communication cell, the controller device from which commands are transmitted may have a function of specifying a particular target device as a device for command execution.

Alternatively, the wireless communication control apparatus and the wireless communication control method associated with the first aspect of the invention may also have reception log storage means or step for storing a reception log at command reception and target identifying means or step for identifying a target of command execution on the basis of the stored latest reception log.

In this case, the above-mentioned command processing means or step may transmit commands only to the particular target specified by the controller device of command transmission source.

Still alternatively, the above-mentioned command processing means or step may transfer the received commands to all target devices which support these commands in the above-mentioned communication cell.

In carrying out the invention and according to a second aspect thereof, there is provided a wireless communication control apparatus or a wireless communication control method for controlling, in a piconet of a Bluetooth wireless network constituted by one master device and a plurality of slave devices, at least one slave device in the piconet having a controller function for issuing commands and at least one slave device having a target function for supporting commands, the master device having both controller and target functions, including: connecting means or step for establishing Bluetooth communication in the piconet; controller/target function grasping means or step for grasping a slave device which functions as a target and/or a controller; and support command grasping means or step for managing the commands supported by each target in the piconet.

In the piconet of the Bluetooth wireless network to which the wireless communication control apparatus and the wireless communication control method associated with the second aspect of the invention are applied, each slave device is communicable only with the master device. On a predetermined profile, each of the master device and the slave devices in the piconet may operate as the controller which issues commands or a slave device which supports commands.

In addition, the wireless communication control apparatus and the wireless communication control method associated with the second aspect of the invention, when applied to a device which becomes the master in the piconet of the Bluetooth wireless network preferably yield the effects of the invention. Such a master device itself functions as both controller and target on a predetermined control profile. The above-mentioned support command grasping means or step may also manage the commands supported by the master device itself.

According to the wireless communication control apparatus and the wireless communication control method associated with the second aspect of the invention, the master device may function as the system controller to manage the control functions of the slave devices operating as targets in the piconet, or the commands supported by them. For a slave device operating as the controller in the piconet to control another slave device, the controller device may issue commands to the master device which is a target. Then, the master device transfers, as the controller device, the received commands to the target namely the slave device which supports these commands.

Consequently, if each slave device in the piconet functions as the controller on the predetermined control profile, it may issue commands to targets in the piconet without being aware of any other devices than the master device.

Likewise, each slave device functioning as a target on a predetermined control profile may only execute the commands received from the master device without being aware of any other devices than the master device (namely without being aware of whether the received command is from another slave device which functions as the controller).

In other words, the slave device operating as the controller transmits commands to the master device as a target and the other slave devices operating as targets may only process the commands received from the master device. Namely, according to the wireless communication control apparatus and the wireless communication control method associated with the second aspect of the invention, control between the slave devices may be realized via the master device in the piconet of the Bluetooth wireless network in which each slave device is communicable only with the master device.

The above-mentioned controller/target function grasping means or step lays a logical link (L2CAP) with each slave device in the piconet to inquire each slave device for its controller function or target function by use of Service Discovery Protocol (SDP).

The above-mentioned support command grasping means or step lays a logical link (L2CAP) with each slave device operating as the target in the piconet to inquire each slave device for support commands by a method defined in an upper application protocol.

The wireless communication control apparatus or the wireless communication control method associated with the second aspect of the invention further including: command receiving means for receiving a command, which is connected with the slave device operating as the controller in the piconet; and command processing means for processing the received command.

This command processing means for step transfers received commands to a targets which support these commands in the same piconet.

If the master device itself on which the wireless communication control apparatus or the wireless communication control method associated with the second aspect of the invention is implemented supports commands, the above-mentioned command processing means or step may cause the master device itself to execute the commands.

If there are two or more target devices which support received commands in the piconet, the controller device, which is the command transmission source, may have a function for specifying a particular target device as a device for command execution.

Alternatively, the wireless communication control apparatus or the wireless communication control method associated with the second aspect of the invention further including: reception log storage means for storing a reception log indicative of command reception; and target identifying means for identifying a target which executes the received command on the basis of the newest log stored in the reception log storage means.

In this case, the above-mentioned command processing means or step transfers received commands only to a particular command in accordance with the specification by the controller device, which is the command transmission source.

Alternatively, the above-mentioned command processing means or step transfers received commands to all target devices which support these commands in the above-mentioned communication cell.

In carrying out the invention and according to a third aspect thereof, there is provided a storage medium physically storing computer software in a computer-readable form, the computer software being described so as to execute, on a computer system, wireless communication control for controlling command exchange between devices in a communication cell which is constituted by one master device and a plurality of slave devices, each slave device being capable of communicating with only the master device, the computer software including the steps of: inquiring each device in the communication cell whether each device operates as a controller or a target; inquiring each device having a target function for a command supported thereby; and managing the commands supported by each target device.

In carrying out the invention and according to a fourth aspect thereof, there is provided a storage medium physically storing computer software in a computer-readable form, the computer software being described so as to execute, on a computer system, wireless communication control for controlling command exchange between devices in a piconet of a Bluetooth wireless network constituted by one master device and a plurality of slave devices, at least one of the plurality of slave devices in the piconet having a controller function for issuing commands, at least one of the other slave devices having a target function for supporting commands, and the master device being capable of having both of the controller function and the target function, the computer software including the steps of: establishing Bluetooth communication in the piconet; grasping a slave device which functions as a target and/or a controller; and managing the commands supported by each target in the piconet.

The storage media associated with the third and fourth aspects of the invention provide, in a computer-readable form, computer software to general-purpose computer systems which can execute a variety of program codes, for example. These storage media are detachable and portable storage media such as CD (Compact Disc), FD (Flexible Disk), and MO (Magneto-Optical disc) for example. Alternatively, it is technologically practicable to provide computer software to particular computer systems via transmission media such as networks (regardless of wired or wireless).

These storage media define the structural or functional cooperative relationship between computer software and storage media in order to realize predetermined computer software on computer systems. In other words, installing predetermined computer software on computer systems through the storage media associated with the third and fourth aspects of the present invention realizes the cooperative action on the computer systems, thereby yielding the same operational effects as those of the wireless communication control apparatuses and the wireless communication control methods associated with the first and second aspects of the present invention.

In carrying out the invention and according to a fifth aspect thereof, there is provided a computer program being described in a computer-readable form so as to execute, on a computer system, wireless communication control for controlling command exchange between devices in a communication cell which is constituted by one master device and a plurality of slave devices, each slave device being capable of communicating with only the master device, the computer software including the steps of: inquiring each device in the communication cell whether each device operates as a controller or a target; inquiring each device having a target function for a command supported thereby; and managing the commands supported by each target device.

In carrying out the invention and according to a sixth aspect thereof, there is provided a computer program being described in a computer-readable form so as to execute, on a computer system, wireless communication control for controlling command exchange between devices in a piconet of a Bluetooth wireless network constituted by one master device and a plurality of slave devices, at least one of the plurality of slave devices in the piconet having a controller function for issuing commands, at least one of the other slave devices having a target function for supporting commands, and the master device being capable of having both of the controller function and the target function, the computer software including the steps of: establishing Bluetooth communication in the piconet; grasping a slave device which functions as a target and/or a controller; and managing the commands supported by each target in the piconet.

The computer programs associated with the fifth and sixth aspects of the invention define the computer programs described in a computer-readable form so as to realize predetermined processing on computer systems. In other words, installing the computer programs associated with the fifth and sixth aspects of the invention on computer systems brings out the cooperative action on computer systems, thereby yielding the same operational effects as those of the wireless communication control apparatuses and the wireless communication control methods associated with the first and second aspects of the present invention.

This invention will be described in further detail by way of example with reference to the accompanying drawings.

BRIEF DESCRIPTION OF DRAWINGS

FIGS. 8 through 17 are flowcharts describing the processing procedures of the system control by the media player 21 within the piconet 20 shown in FIG. 5.

FIG. 23 is a diagram schematically illustrating a structure of "Inquiry" message frame for the media player 31 which is the system controller to inquire the headphone B34 which is an AVRCP target whether it supports command "input select".

FIG. 24 is a diagram schematically illustrating a structure of "Not Implemented" message frame for the headphone B34 which is an AVRCP target to return information that its does not support command "input select" to the medial player 31.

FIG. 25 is a chart illustrating a processing procedure in which the remote commander 35 functioning as the AVRCP controller transmits commands to each AVRCP target via the media player 31 functioning as the system controller to perform remote control operations.

FIG. 29 is a diagram schematically illustrating a structure of "Control" message frame for the remote commander 35 functioning as the AVRCP controller to transmit a "Mute" command to the medial player 31 functioning as the system controller.

FIG. 30 is a diagram schematically illustrating a structure of "Accepted" message frame for the media player 31 functioning as the system controller to return information that it has accepted the "Mute" command to the remote commander 35 functioning as the AVRCP controller.

FIG. 31 is a diagram schematically illustrating a structure of "Control" message frame for the media player 31 functioning as the AVRCP controller to transmit a "Mute" command to a TV tuner 32 which is an AVRCP target.

FIG. 32 is a diagram schematically illustrating a structure of "Accepted" message frame for the TV tuner 32 which is an AVRCP target to return information that it has accepted the "Mute" command to the media player 31 functioning as the AVRCP controller.

BEST MODE FOR CARRYING OUT THE INVENTION

This invention will be described in further detail by way of example with reference to the accompanying drawings.

Figure 1:
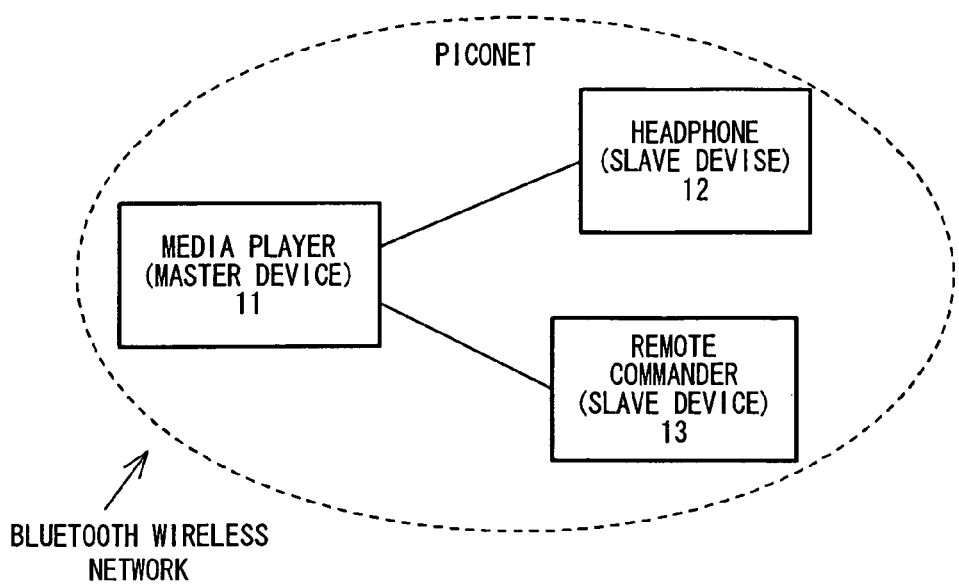
FIG. 1 is a schematic diagram illustrating a configuration of a Bluetooth piconet practiced as one embodiment of the invention.

First, a piconet 10 of a Bluetooth wireless network as shown in FIG. 1 is described below. As described earlier, the piconet 10 is constituted by one master device given with the control function for maintaining the order of communication and up to seven slave devices.

If a plurality of slave devices exist in the same piconet 10, the communication between the master device and each of the slave devices is shared by all of these slave devices in a time division multiplexing manner except in the case of broadcast communication. The unit in which time division multiplexing is executed is a time interval of 625 microseconds called a "time slot."

With respect to the directions of packet transfer between the master and each slave in the same piconet 10, a packet is transferred from maser to slave if its slot number is even and from slave to master if its slot number of odd. Thus, in Bluetooth, packets can be transferred between master and slave, but cannot be directly transferred between slave devices.

In the example shown in FIG. 1, Bluetooth is applied to the wireless connection between AV devices. The piconet 10 contains a media player 11 functioning as the master device and a headphone 12 and a remote commander 13, which are slave devices. The remote commander 13 remotely controls the media player 11 for executing play control such as play, stop, pause, fast forward and rewind and remotely controls the headphone 12 for executing sound volume adjustment (volume up/down) for example.

Figure 2:
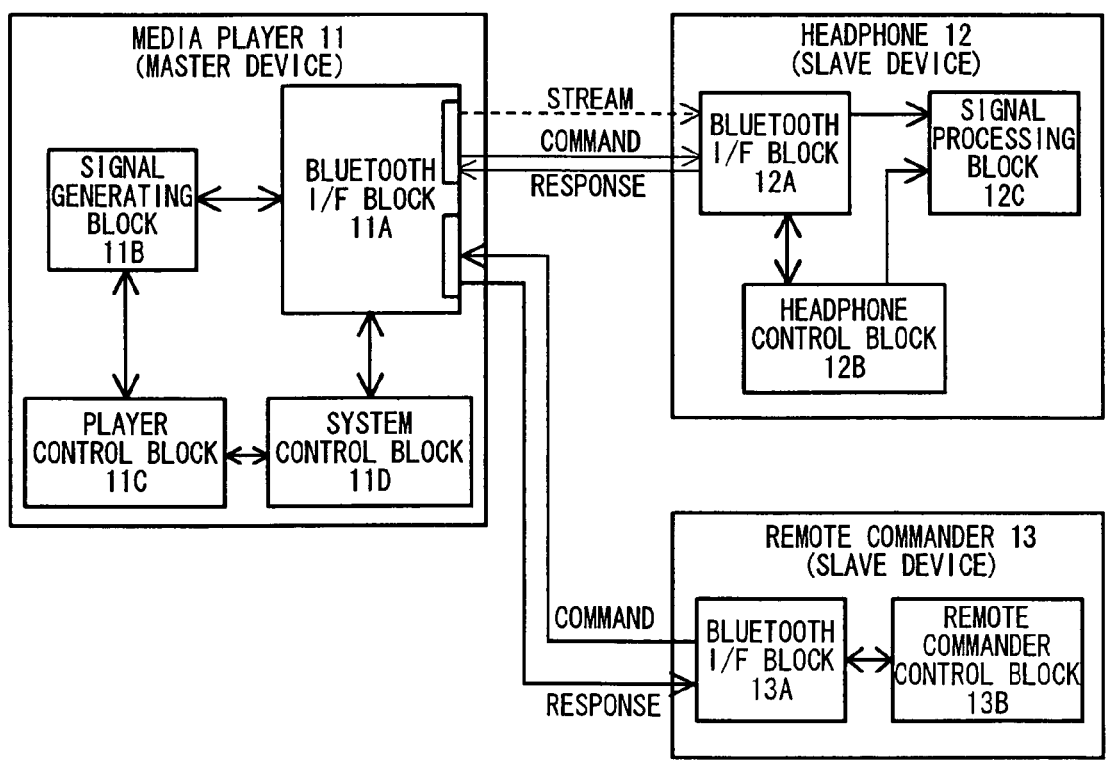
FIG. 2 is a functional block diagram illustrating a configuration of devices 11 through 13 which constitute a piconet 10 shown in FIG. 1.

FIG. 2 schematically illustrates a configuration of the devices 11 through 13 constituting the piconet 10 shown in FIG. 1.

The media player 11 is constituted by a Bluetooth interface block 11A, a signal generating block 11B, a player control block 11C, and a system control block 11D.

The Bluetooth interface block 11A is a functional block for realizing the Bluetooth wireless connection in the piconet 10 and transfers commands and responses with the slave devices 12 and 13 in the piconet 10.

The signal generating block 11B is a functional block for generating signals for controlling such communication states in the piconet 10 as the Bluetooth clock.

The player control block 11C is a functional block for realizing such media play control functions as play, stop, pause, fast forward and rewind of media loaded on the media player 11.

The system control block 11D is a functional block for realizing total control of the slave devices 12 and 13 in the piconet 10. In the present embodiment, the system control block 11D manages the controller and target functions in the control profile AVRCP for remotely controlling AV equipment to enable control by one slave device of another slave device via the master device 11, to be more specific, control by the remote commander 13 of the headphone 12, another slave device. The details of the system control in the piconet 10 by the system control block 11D will be described later.

The headphone 12 is constituted by a Bluetooth interface block 12A, a headphone control block 12B, and a signal processing block 12C.

The Bluetooth interface block 12A is a functional block for realizing the Bluetooth wireless connection in the piconet 10 and transfers commands, responses, and data streams with the master device 11.

The headphone control block 12B is a functional block for realizing such sound output functions as volume up, volume down, and mute.

The signal processing block 12C is a functional block for processing the control signals received from the master device 11 by the Bluetooth wireless communication and the controls signals issued by the headphone control block 12B.

In the present embodiment, the headphone 12 may be configured as a slave device compatible only to the conventional AV equipment profile "AV Remote Control Profile" (AVRCP).

The remote commander 13 is constituted by a Bluetooth interface block 13A and a remote control block 13B.

The Bluetooth interface block 13A is a functional block for realizing the Bluetooth wireless connection in the piconet 10 and transfers commands and responses with the master device 11.

The remote control block 13B is a functional block for realizing media play control such as play, stop, pause, fast forward, and rewind of media loaded on the media player 11 and sound output control such as volume up, volume down, and mute of the headphone 12.

In the present embodiment, as with the headphone 12, the remote commander 13 may be configured as a slave device compatible only with the conventional AV equipment control profile "AV Remote Control Profile" (AVRCP).

The AV Remote Control Profile (AVRCP), one of the Bluetooth application profiles is intended to realize the AV equipment control similar to infrared remote control on each Bluetooth wireless network. The command transmitting side is called a "controller," while the side which receives commands the returns responses is called a "target."

Figure 3:
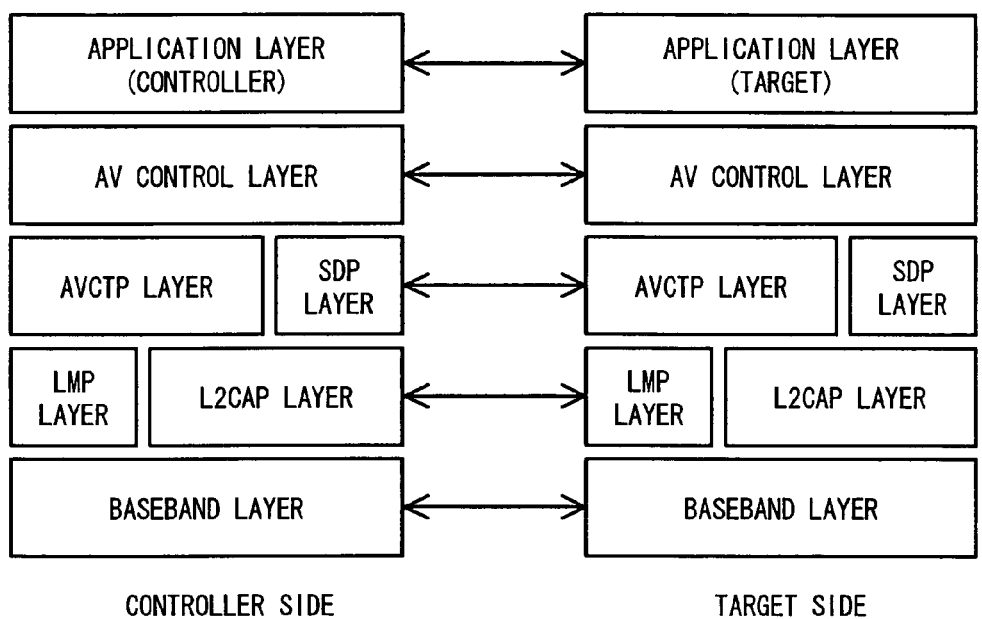
FIG. 3 is a schematic diagram illustrating a structure of a profile stack of AV Remote Control Profile (AVRCP).

FIG. 3 schematically illustrates the profile stack structure of AV Remote Control Profile (AVRCP).

In the figure, a baseband layer, an LMP layer, and an L2CAP layer are Bluetooth protocols equivalent to the first layer and the second layer of an OSI (Open Systems Interconnect) basic reference model.

An AVCTP (AV Control Transport Protocol) layer specifies the processing procedure and message exchange for controlling AV equipment.

An SDP layer specifies the Bluetooth service discovery protocol and allows the master device 11 functioning as the system controller to detect the controller function and target function of the slave devices 12 and 13 in the piconet 10.

The AV control layer is an entity for controlling AV equipment on an AV/C command basis.

In the present embodiment, the headphone 12 has the AVRCP target function so as to control volume up and volume down operations from the outside.

The remote commander 13 has the AVRCP controller function so as to remotely control outside equipment including the headphone 12.

The media player 11 has both the AVRCP controller and target functions. Namely, the media player 11 has the controller function for transmitting the volume up and volume-down commands to the headphone 12 and the target function for receiving the media play and stop commands for example from the remote commander 13 and processing them.

As described earlier, in the piconet 10, the media player 11 is defined as the master device in the Bluetooth wireless communication and the headphone 12 and the remote commander 13 are defined as its slave devices.

The following describes an example of a so-called "universal remote commander" which may remotely control equipment of various categories.

Each of the remote commander of this type has keys including play, stop, FF, rewind, pause, volume up, volume down, channel up, channel down, up, down, right, left, and execute, thereby issuing commands corresponding to user's key operations.

In the present embodiment, the remote commander 13 is defined as a slave device, so that it cannot communicate with the media player 11, which is the master device. In other words, the above-mentioned commands issued from the remote commander 13 may be transmitted only to the media player 11.

On the other hand, the media player 11, which is the mate of communication of the remote commander 13, can execute the commands associated with media play control such as play, stop, FF, rewind, and pause among the commands received from the remote commander 13, but, because no speaker is incorporated, cannot execute the commands associated with volume adjustment such as volume up and volume down.

Based on the function of the system control block 11D to be described later, the media player 11 associated with the present embodiment can become the system controller in the piconet 10 to transfer the received commands for volume up and volume down to the headphone 12.

The following describes the processing procedure of the system control function in the piconet 10 of the media player 11 to be realized by the system control block 11D.

(1) Establishing the Bluetooth Communication in the Piconet:

The connection of the Bluetooth communication in the piconet 10 is established by going through inquiry and page phases. Consequently, the media player 11 operating as the system controller in the piconet 10 is defined as the master device.

It should be noted that the inquiry denotes herein the first-stage processing phase for providing the synchronization in piconet, in which the master device 11 checks the existence of the slave devices 12 and 13 in the piconet 10. The page denotes herein the second-stage processing phase for providing the synchronization in piconet, in which, on the basis of a result of the inquiry, the master device establishes the synchronization in piconet between the particular slave devices 12 and 13.

(2) Grasping the AVRCP Controller/Target Functions for each Slave Device in Piconet:

The media player 11 as the system controller lays the connection of a logical link (L2CAP) for performing service discovery on the headphone 12 and the remote commander 13 which are the slave devices in the same piconet 10 and, by use of the service discovery protocol (SDP), grasps the functions in the AVRCP protocol of the headphone 12 and the remote commander 13.

In the example shown in FIG. 1, by use of SDP, the media player 11 as the system controller knows that the remote commander 13 has an AVRCP controller function and the headphone 12 is compatible with an AVRCP target function. In the present embodiment, the headphone 12 is compatible with an AVRCP category 2 (monitor/amplifier) function, which is also grasped by the SDP procedure. (These items of information are held in each device as a service record.)

Next, the media player 11 as the system controller lays the connection of the logical link (L2CAP) for device control with the headphone 12. Then, the media player 11 transmits a support inquiry command to check which of AVRCP commands is supported by the headphone. In AVRCP, an AV/C command is used as the protocol for AV equipment control (refer to FIG. 3).

Figure 4:
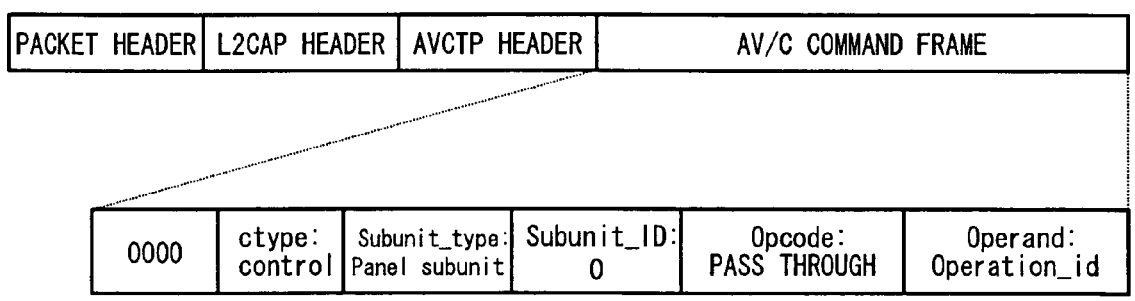
FIG. 4 is a diagram illustrating a structure of an AVRCP command frame by use of PASS THROUGH command for example.

For a command for remote commander control, a PASS THROUGH command defined in the AV/C panel subunit is applied. FIG. 4 shows the structure of AVRCP command frame by use of the PASS THROUGH command for example. As shown, this command frame is configured by a packet header, an L2CAP header, an AV control transport protocol (AVCTP) and an AV/C command in this order. The packet header includes an identifier for identifying a slave in communication in the piconet. The AV/C commands include a SPECIFIC INQUIRY command for inquiring the support condition for each control command. When the SPECIFIC INQUIRY command is transmitted attached with the same operation code as control and an operand, the implementation on the target device may be known without involving an actual operation. By this SPECIFIC INQUIRY command, the implementation condition of each operation of the PASS THROUGH command may be known.

In the present embodiment, the belonging of the headphone to category 2 (described above) is known in advance, so that only the operation of category 2 may be checked. The following table (Table 1) lists the operations in category 2.

TABLE 1

0
1
.
.
.
9
dot
enter
sound select
input select
display information
help
power
volume up
volume down
mute
vendor unique In category 2, the support in target device of volume up and volume down is mandatory, so that, whether they are supported or not need to be checked. For example, assumed that the headphone 12 also support mute in addition to volume up and volume down. Then, the headphone 12 which received the SPECIFIC INQUIRY command for each operation ID from the media player 11 returns response called IMPLEMENTED to the command which corresponds to these three implemented operations. For the inquiries for the other operations not implemented, the headphone 12 returns a response called NOT IMPLEMENTED.

(3) Managing Support Commands for each AVRCP Target in Piconet:

The media player 11 as the system controller also generates a list of commands to be supported when the media player 11 itself functions as a target device and a list of commands for controlling the target device (the headphone 12 in the example shown in FIG. 1) in the piconet 10 by the media player 11 (namely, the commands supported by the headphone 12). An example of generated lists is shown in Table 2 below.

TABLE 2

| Commands (operations) supported by medial player | Commands (operations) supported by headphone |
| --- | --- |
| play | volume up |
| stop | volume down |
| pause | mute |
| record | |
| rewind | |
| fast forward | |

(4) Connecting AVRCP controller with Bluetooth master device:

The remote commander 13 lays, as the AVRCP controller, the connection of a logical link (L2CAP) with the media player 11 in the piconet 10. In response, the media player 11 responds to this connection when it becomes ready for functioning as the system controller.

(5) Transmitting Commands Form AVRCP Controller:

In order to transmit commands to AV equipment, the user operates corresponding keys on the remote commander 13. In response, the remote commander 13 transmits, as the AVRCP controller, specified commands to the media player 11 which is the AVRCP target.

(6) Transferring Commands to AVRCP Target:

The media player 11 which is the AVRCP target incorporates the system control block 11D (described above). This system control block 11D interprets the commands received from the AVRCP controller (the remote commander 13 shown in FIG. 1) in the piconet 10.

If the command interpretation indicates that the received command is one of the commands listed in the left column of Table 2 such as "play" indicative of media play start, namely the received command is for the media play control supported by the media player 11 itself, then the media player 11 passes this command to the player control block 11C in it and returns an ACCEPTED response indicative of the acceptance of the command to the requesting remote commander 13.

If the command interpretation indicates that the received command is one of the commands listed in the right column of Table 2 such as "volume up," namely the received command is supported by the AVRCP target (the headphone 12 shown in FIG. 1) other than the media player 11, the media player 11 returns an ACCEPTED response indicative of the acceptance of the command to the command transmitting remote commander 13 and transfers the received command directly to the supporting device, namely the headphone 12.

If the command received by the system control block is not listed in Table 2, namely, not supported by any AVRCP targets in the piconet 10, then the media player 11 returns NOT IMPLEMENTED response to the command transmitting remote commander 13, thereby ignoring the processing of the received command.

(7) Executing Commands by AVRCP Target:

As described, when command transmission to the headphone 12 has been performed, the headphone 12 interprets that the media player 11 as the Bluetooth master device has transmitted the volume up command by becoming the controller (in other words, without being aware that the command has been issued from the remote commander 13) and returns an ACCEPTED response indicative of the acceptance of the command to the media player 11, thereby executing the volume up command.

As described, on the AVRCP control profile, the media player 11 has the target function and the controller function on its own and generates a command list in the system control block 11D to grasp the commands supported by each of the target devices (the headphone 12 and the media player 11 itself in the example shown in FIG. 1) in the piconet 10.

As a result, the remote commander 13 may only control the media player 11 as the target having the function of the headphone 12 by becoming the AVRCP controller. Therefore, the remote commander 13 may be configured as a slave device compatible with the conventional AVRCP.

The headphone 12 may only receive and execute, as the AVRCP target, the command from the media player 11 which is the AVRCP controller. Therefore, the headphone 12 may be configured as a slave device compatible with the conventional AVRCP. Obviously, the headphone 12 need not be aware that the received command is from the remote commander 13.

The following describes an exemplary application which uses the system controller function of a Bluetooth master device such as mentioned above.

For example, assume that the media player 11 as the master device have an LCD (Liquid Crystal Display) display function (not shown) and a variety of settings associated with AVRCP command control can be performed on this LCD (Liquid Crystal Display) display function.

In this case, it may also be specified on a menu screen (not shown) whether to restrict the operation on the remote commander 13 to the main frame of the media player 11 or extend it to the other slave devices in the piconet 10, namely the targets. Alternatively, instead of using a display device such as LCD, an on/off switch associated with command transfer or an equivalent mechanical button (not shown) may be arranged on the main frame of the media player 11.

In more sophisticated applications, the above-mentioned configuration is also applicable to the case in which there are devices of the same category (namely, the target devices which support the same command) in one piconet 10.

Figure 5:
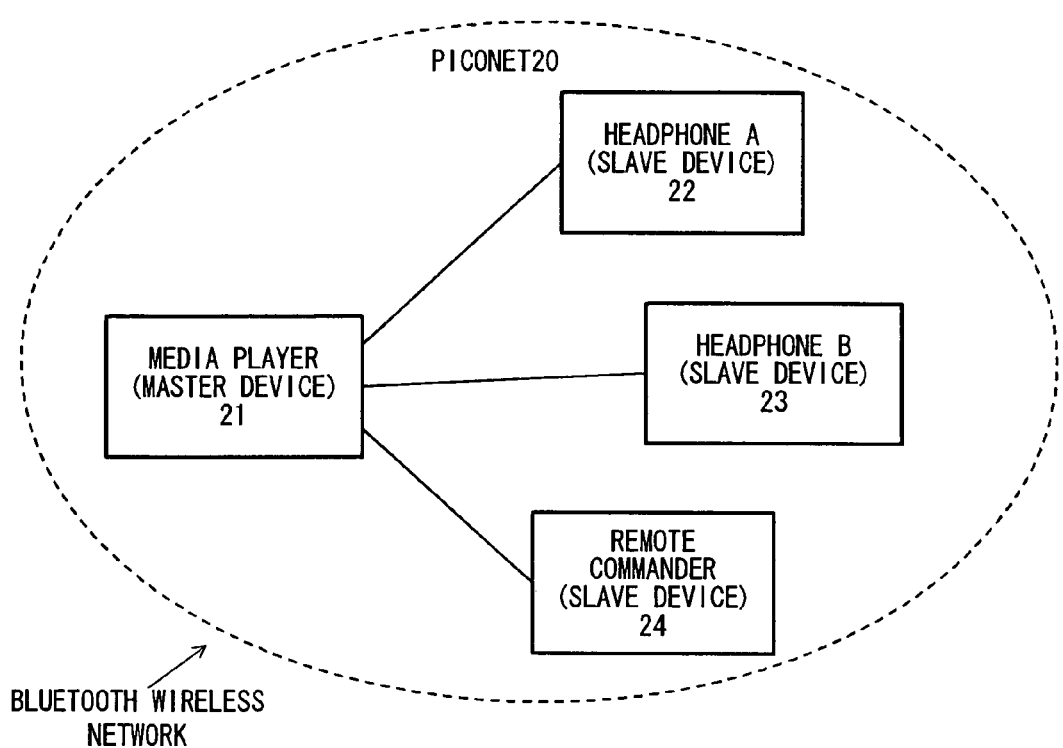
FIG. 5 is a schematic diagram illustrating an example in which a plurality of slave devices of the same category exist within a piconet 20 in a Bluetooth wireless network.

FIG. 5 shows an example in which two or more slave devices of the same category in one piconet 20 a Bluetooth wireless network.

In the piconet 20 shown, there are a media player 21 as the master device, a headphone A22 and a headphone B23 as slave devices, and a remote commander 24 as a slave device.

The remote commander 24 which is a slave device in the piconet 20 operates, on the control profile AVRCP, as the controller which issues commands associated with media play control and output volume adjustment.

The media player 21 which is the master device in the piconet 20 has, on the control profile AVRCP, the controller function for issuing commands such as volume control commands to the headphone A22 and the headphone B23 and the target function for performing media play control such as play, stop, pause, fast forward, and rewind of media in response to the commands from the remote commander 24.

Each of the headphone A22 and the headphone B23 which are the slave devices in the piconet 20 supports, on the control profile AVRCP, as a target, the commands of the same category associated with volume adjustment.

As shown in FIG. 5, if the headphone A22 and the headphone B23 exist in the piconet 20 in which the media player 21 is the master, the media player 21 as the system controller in the piconet 20 is not sure to which of these headphones a command "volume up" from the remote commander 24 is to be transferred.

Hence, in the present embodiment, if there are two or more targets of the same category in a piconet, the system control rules are determined so that the controller, from which commands are issued, namely, the remote commander 24 can specify to which of these target the commands are to be transferred.

For example, if functions keys such as F1, F2, F3, F4, and so on are arranged on the remote commander 24, the key button operations are assigned to the specification of the target devices. The following shows an example of the assignment of the function keys to the specification of target devices.

To transmit commands to the headphone A (to adjust the volume of the headphone A), press F1 key and then press a command button (for example, volume up).

To transmit commands to the headphone B (to adjust the volume of the headphone B), press F2 key and then press a command button (for example, volume up).

To transmit commands to both the headphone A and the headphone B (to adjust the volumes of both the headphones A and B), press F3 key and then press a command button (for example, volume up).

To end the transmission of commands to the headphone A and the headphone B (to end the operations of the headphone A and the headphone B), press F4 key and then press a command button (for example, volume up).

Figure 6:
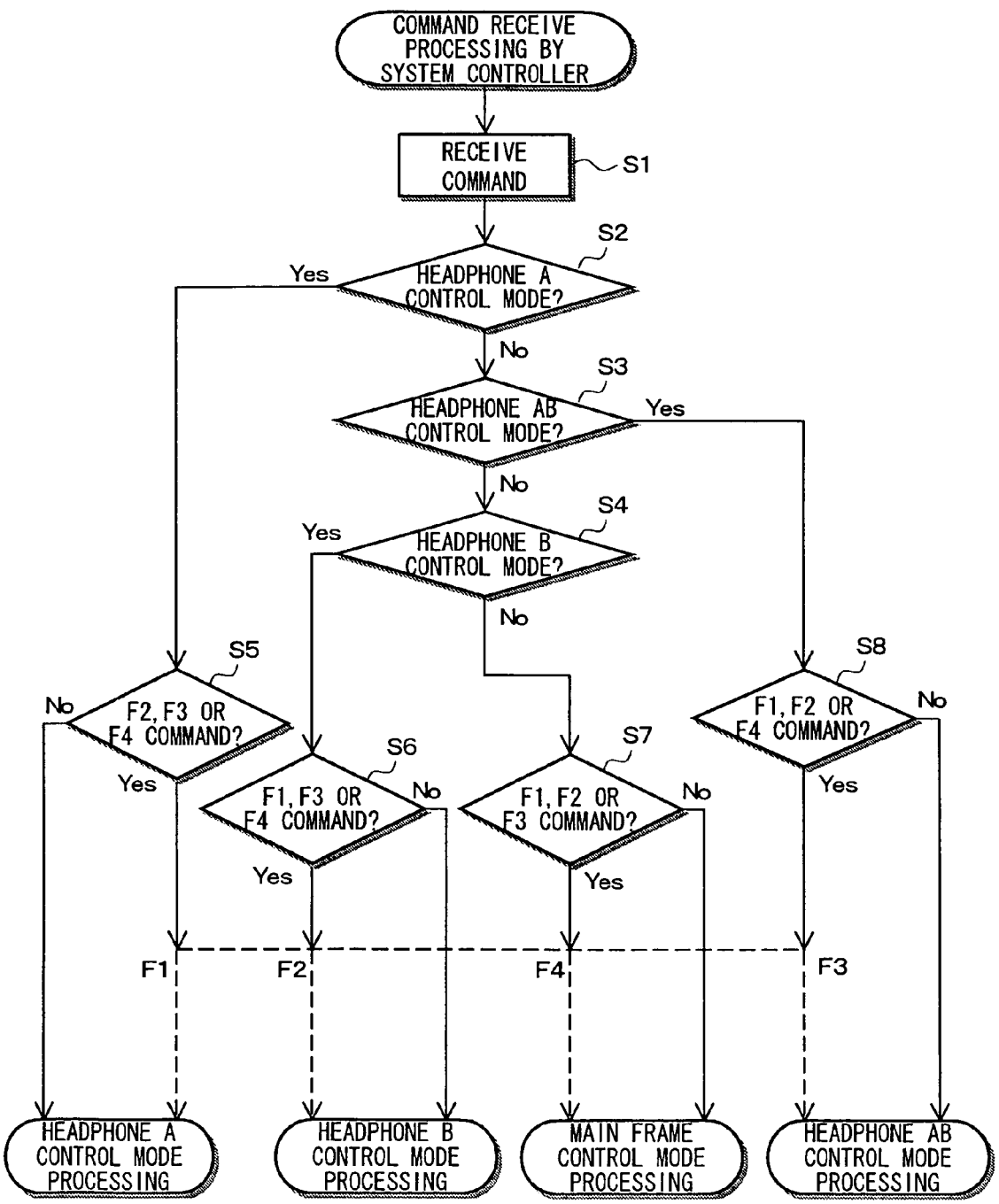
FIG. 6 is a flowchart approximately describing a processing procedure of system control by a media player 21 which functions as a system controller in the piconet shown in FIG. 5.

FIG. 6 approximately shows a flowchart describing a system control processing procedure by the media player 21 as the system controller in the piconet 20 shown in FIG. 5. It is assumed, however, that the media player 21 grasp the controller and/or target function on the control profile AVRCP of the slave devices 22, 23, and 24 in the piconet 20 through the procedure described above and manage the commands supported by the target devices 22 and 23. The following describes the system control processing in he piconet 20 with reference to the flowchart shown in FIG. 6.

Receiving a command from the remote commander 24 (step S1), the media player 21 first determines whether the headphone A control mode is on (step S2). When function key F1 is pressed, the remote commander 24 can specify that it is the control mode of the headphone A22 (as described above).

If the headphone A control mode is found on, the procedure goes to decision block S5 to further determine whether a command associated with F2, F3, or F4 has been received from the remote commander 24.

If a command associated with F2, F3, or F4 has not been received from the remote commander 24, the media player 21 controls the headphone A22 in the headphone A control mode in accordance with the command received from the remote commander 24.

On the other hand, if a command associated with F2, F3, or F4 has been received from the remote commander 24, the headphone B control mode is entered in response to the reception of F2 command. And, in response to the reception of F3 command, the headphone AB control mode is entered. In response to the reception of F4 command, the operations of the headphone A and the headphone B are stopped, upon which the control mode of the media player 21 is entered.

If, in decision block S2, the headphone A mode is found not entered, then the procedure goes to subsequent decision block S3 to determine whether the headphone AB control mode has been entered. When function key F3 is pressed, the remote commander 24 can specify that it is the headphone AB control mode (as described above).

If the headphone AB mode is found entered, the procedure goes to decision block S8 to check if a command associated with F1, F2, or F4 has been received from the remote commander 24.

If a command associated with F1, F2, or F4 has not been received from the remote commander 24, the media player 21 controls both the headphones A and B in the headphone AB control mode in accordance with the command received from the remote commander 24.

On the other hand, if a command associated with F1, F2, or F4 has been received from the remote commander 24, then the headphone A control mode is entered in response to the reception of F1 command. And, in response to the reception of F2 command, the headphone B control mode is entered. In response to the reception of F4 command, the operations of the headphones A and B are stopped, upon which the control mode of the main frame of the media player 21 is entered.

If the headphone AB control mode is found not entered in decision block S3, then the procedure goes to subsequent decision block S4 to determine whether the headphone B mode is entered. When function key F2 is pressed, the remote commander 24 can specify that it is the headphone B control mode (as described above).

If the headphone B control mode is found entered, then the procedure goes to decision block S6 to further check if a command associated with F1, F3, or F4 has been received from the remote commander 24.

If a command associated with F1, F3, or F4 has not been received from the remote commander 24, then the media player 21 controls the headphone B in the headphone B control mode in accordance with the command received from the remote commander 24.

On the other hand, if a command associated with F1, F3, or F4 has been received from the remote commander 24, the headphone A control mode is entered in response to the reception of F1 command. And, in response to the reception of F3 command, the control mode of both the headphones A and B is entered. In response to the reception of F4 command, the operations of the headphones A and B are stopped, upon which the control mode of the main frame of the media player 21 is entered.

If the headphone B control mode is found not entered in decision block S4, then the procedure goes to subsequent decision block S7 to check if a command associated with F1, F2, or F4 has been received from the remote commander 24.

If a command associated with F1, F2, or F3 has not been received from the remote commander 24, the media player 21 executes the command received from the remote commander 24 in the control mode of the main frame of the media player 21.

On the other hand, if a command associated with F1, F2, or F3 has been received from the remote commander 24, then the headphone A control mode is entered in response to the reception of F1 command. And, in response to the reception of F2 command, the headphone B control mode is entered. In response to the reception of F3 command, the headphone AB control mode is entered.

Figure 7:
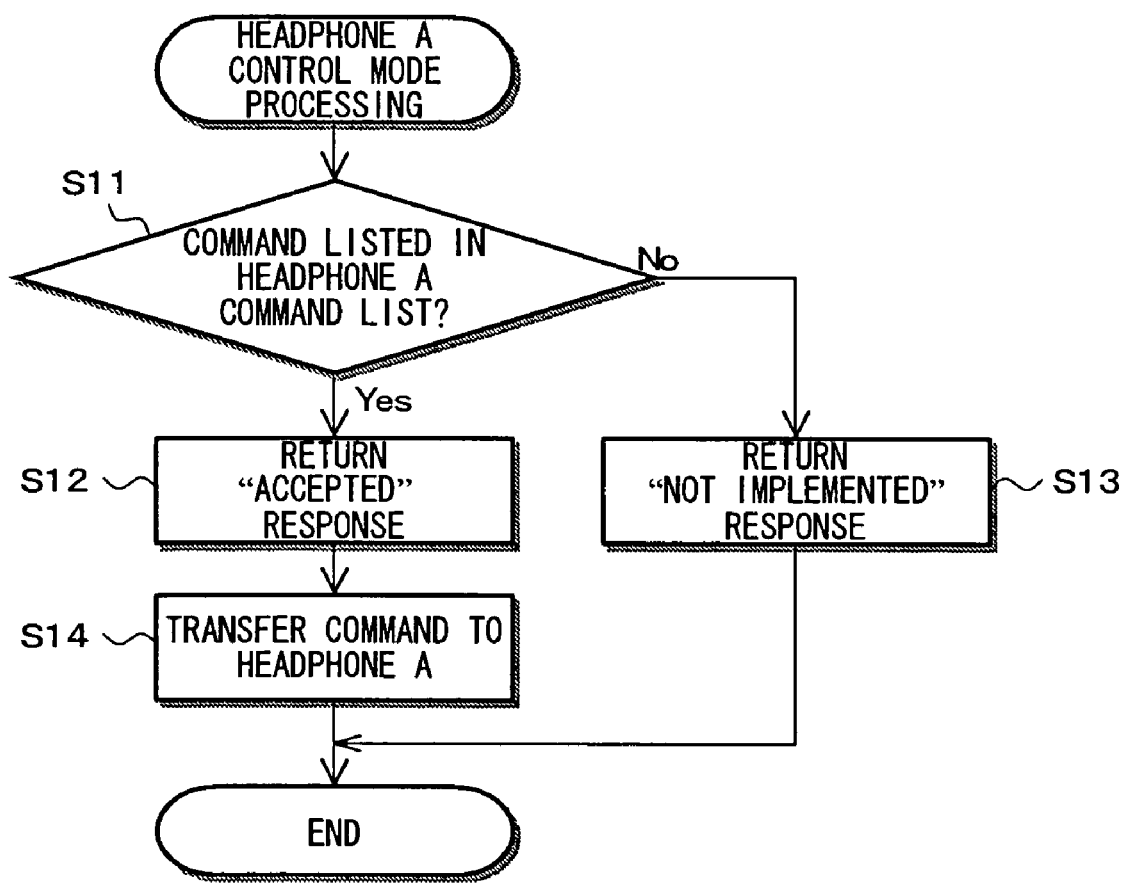
FIG. 7 is a flowchart approximately describing a processing procedure for the media player 21 functioning as the system controller processes a command transmitted from a remote commander 24 in a headphone A control mode.

FIG. 7 approximately shows a flowchart describing a procedure for the media player 21 as the system controller to process the commands from the remote commander 24 in the headphone A control mode. The following describes the command processing by the media player 21 with reference to this flowchart.

Receiving a command from the remote commander 24 the system control block (described above) of the media player 21 determines whether the received command is listed in the command list (Table 2) of the headphone A22, in other words, whether the received command is supported by the headphone A22 which is a target (step S11).

If the received command is found supported by the headphone A, then an ACCEPTED response indicative of the acceptance of the command is returned to the command transmitting remote commander 24 (step S12). On the other hand, if the received command is fount not supported by the headphone A, then a NOT IMPLEMENTED response is returned to the command transmitting remote commander 24 (step S13), upon which this processing routine comes to an end in its entirety.

Next, the command is transferred to the headphone A (step S14), upon which this processing routine comes to an end in its entirety.

The following details a system control processing procedure by the media player 21 which is the system controller in the piconet 20 shown in FIG. 5 with reference to FIGS. 8 through 17. It is assumed here that the media player 21 grasp the controller and target functions on the control profile AVRCP of the slave devices 22, 23, and 24 in the piconet 10 through the above-mentioned procedure and manage the support commands of the target devices 22 and 23.

Figure 8:
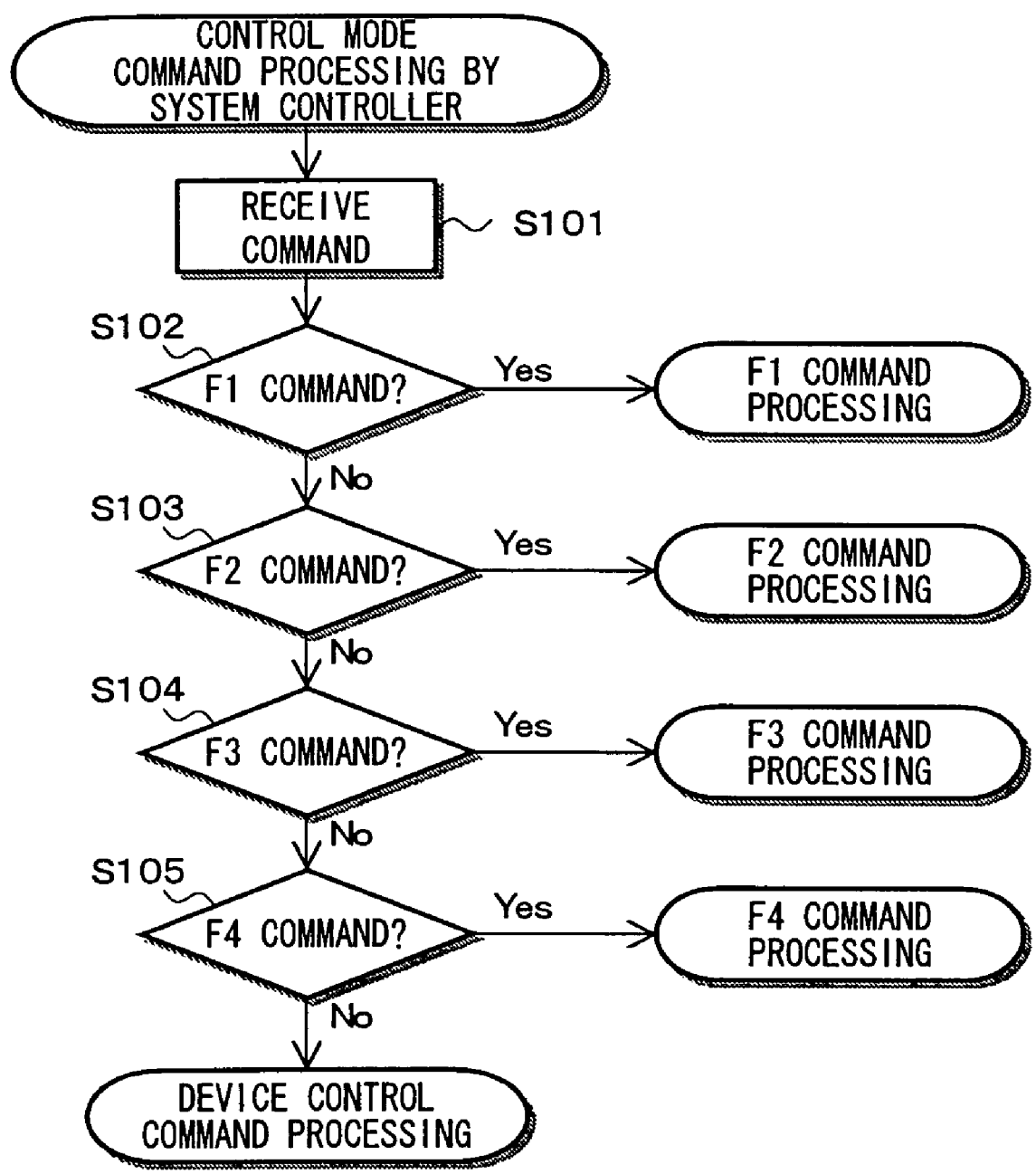

Referring to FIG. 8, receiving a command from the remote commander 24 (step S101), the media player 21 first determines whether the received command is "F1" or not (step S102). If the received command is found not "F1," the media player 21 determines whether the received command is "F2," "F3," or "F4" (steps S102, S103, and S104). Because the "F1," "F2," "F3," and "F4" commands are used to specify device control modes, if the received command is one of "F1," "F2," "F3," and "F4," the procedure goes to the command processing shown in FIG. 9, 10, 11, or 12 accordingly. If the received command is one of "F1," "F2," "F3," and "F4," then the received command is not for specifying the device control mode but for control itself, so that the procedure goes to the device control command processing shown in FIG. 13.

Figure 9:
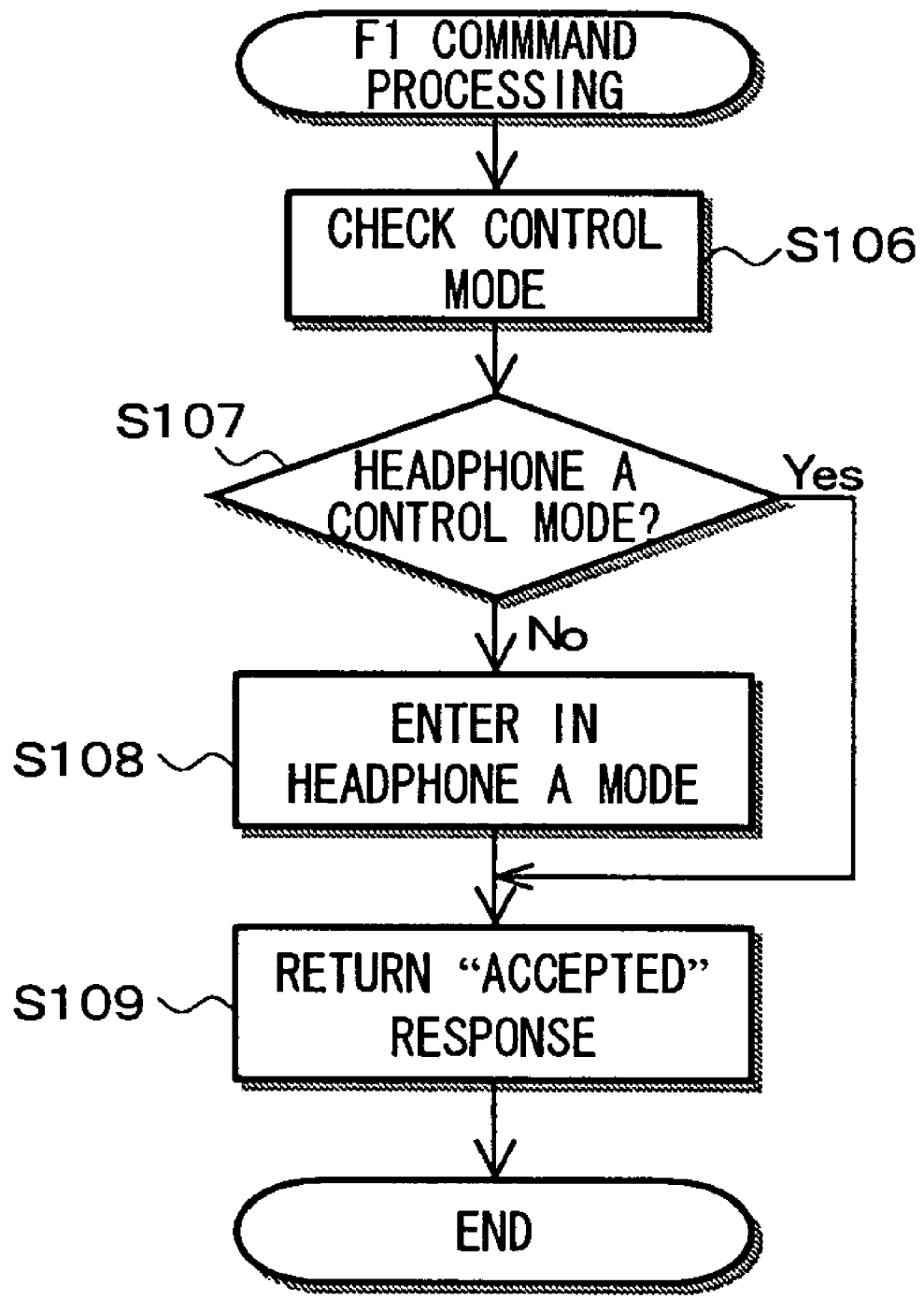

FIG. 9 shows a flowchart of a processing procedure to be executed by the media player 21 when "F1" command is received. First, the media player 21 determines the current control mode (step S106). Then, the media player 21 determines whether the headphone A control mode has already been entered (step S107). If this mode has not been entered, the "headphone A control mode" is entered (step S108). If the headphone A control mode has been entered, the mode change does not take place. Next, an ACCEPTED response indicative of the acceptance of the command is returned to the command transmitting remote commander 24 (step S109), upon which this processing routines comes to an end in its entirety.

Figure 10:
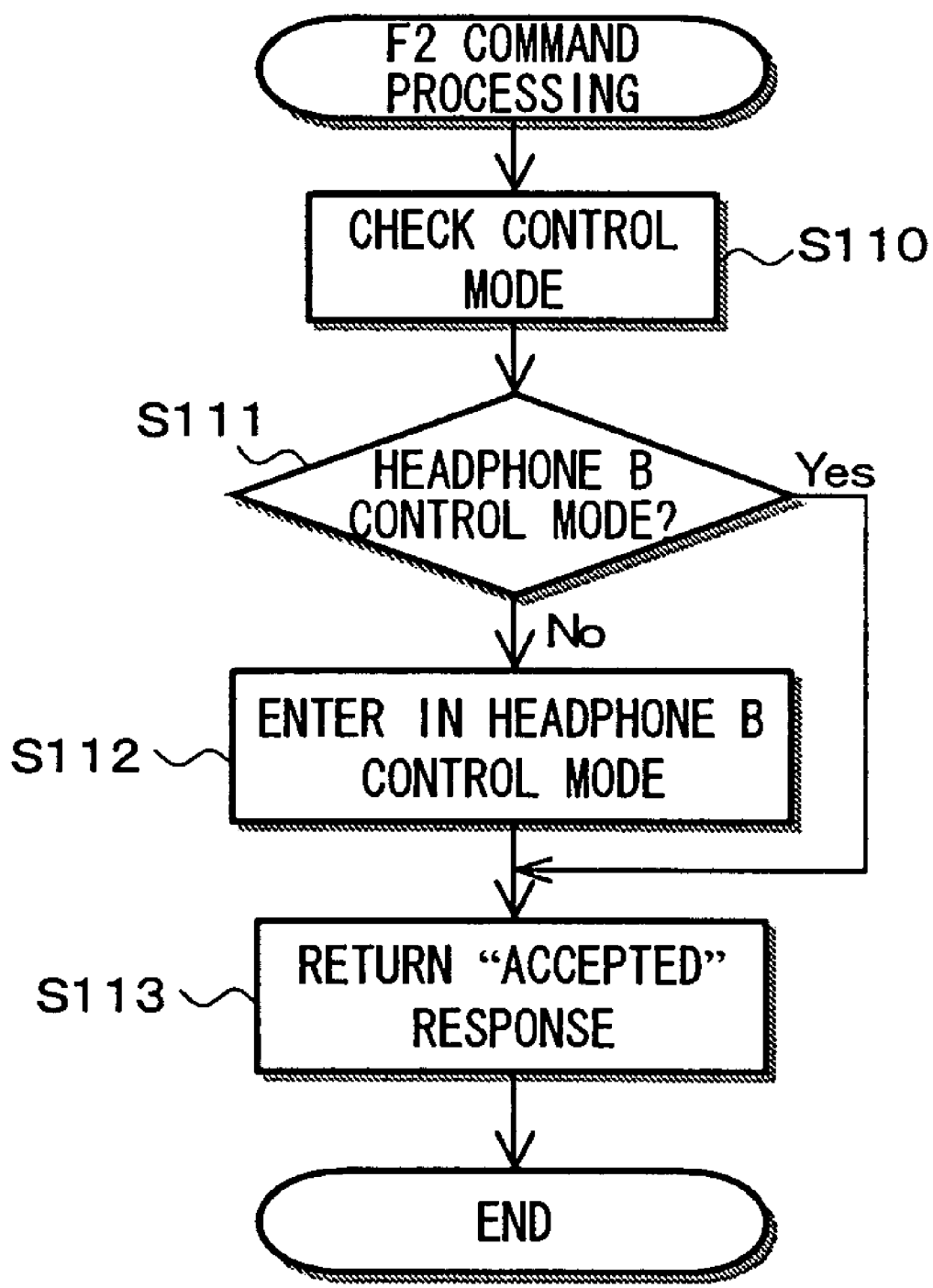

FIG. 10 shows a flowchart describing a processing procedure to be executed by the media player 21 when it receives "F2" command. First, the media player 21 determines the current control mode (step S110). Then, the media player 21 determines whether the headphone B control mode has already been entered (step S111). If this mode has not been entered, the "headphone B control mode" is entered (step S112). If the headphone B control mode has been entered, the mode change does not take place. Next, an ACCEPTED response indicative the acceptance of the command is returned to the command transmitting remote commander 24 (step S113), upon which this processing routines comes to an end in its entirety.

Figure 11:
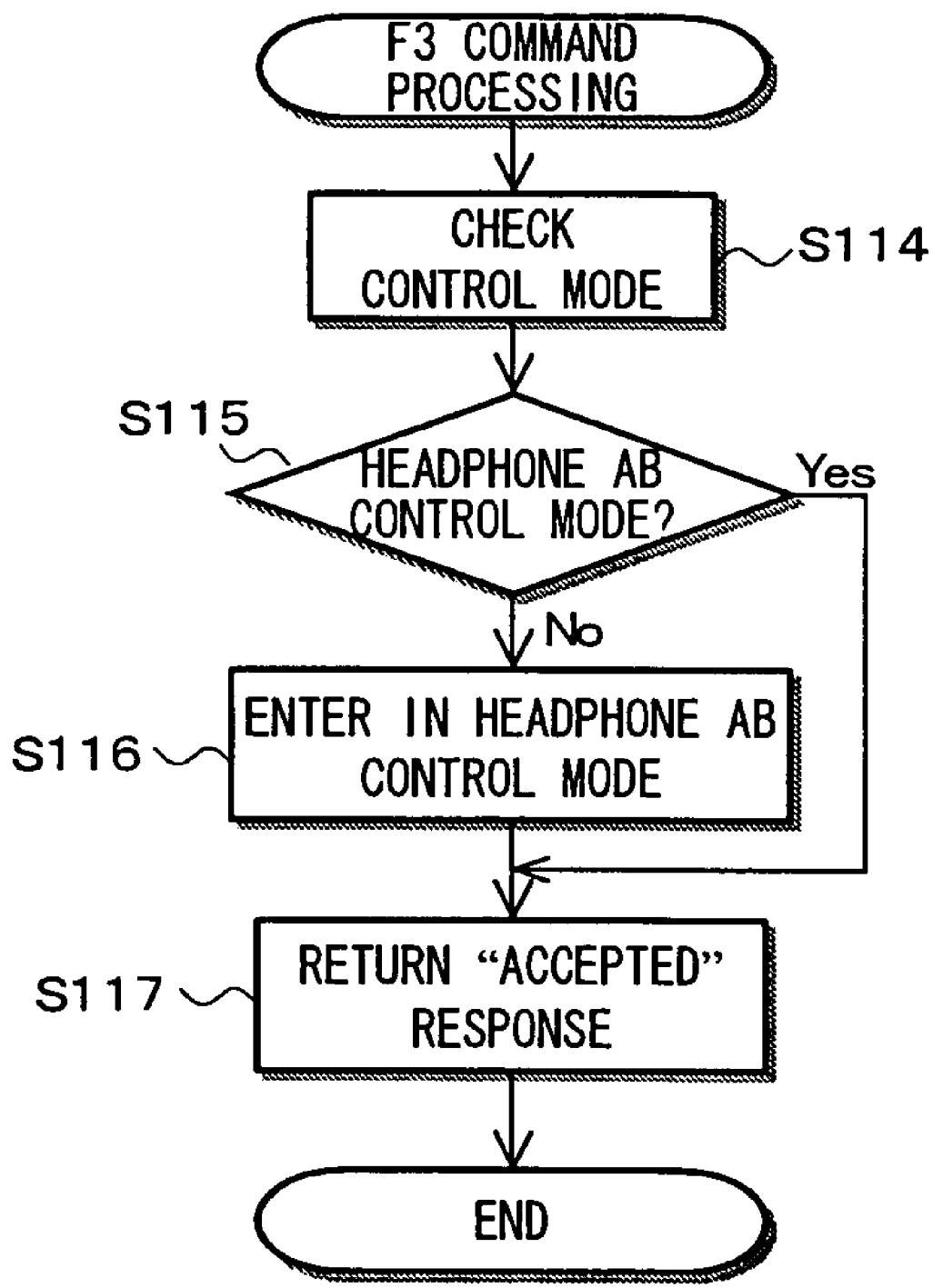

FIG. 11 shows a flowchart describing a processing procedure to be executed by the media player 21 when it receives "F3" command. First, the media player 21 determines the current control mode (step S114). Then, the media player 21 determines whether the headphone AB control mode has already been entered (step S115). If this mode has not been entered, the "headphone AB control mode" is entered (step S116). If the headphone AB control mode has been entered, the mode change does not take place. Next, an ACCEPTED response indicative the acceptance of the command is returned to the command transmitting remote commander 24 (step S117), upon which this processing routines comes to an end in its entirety.

Figure 12:
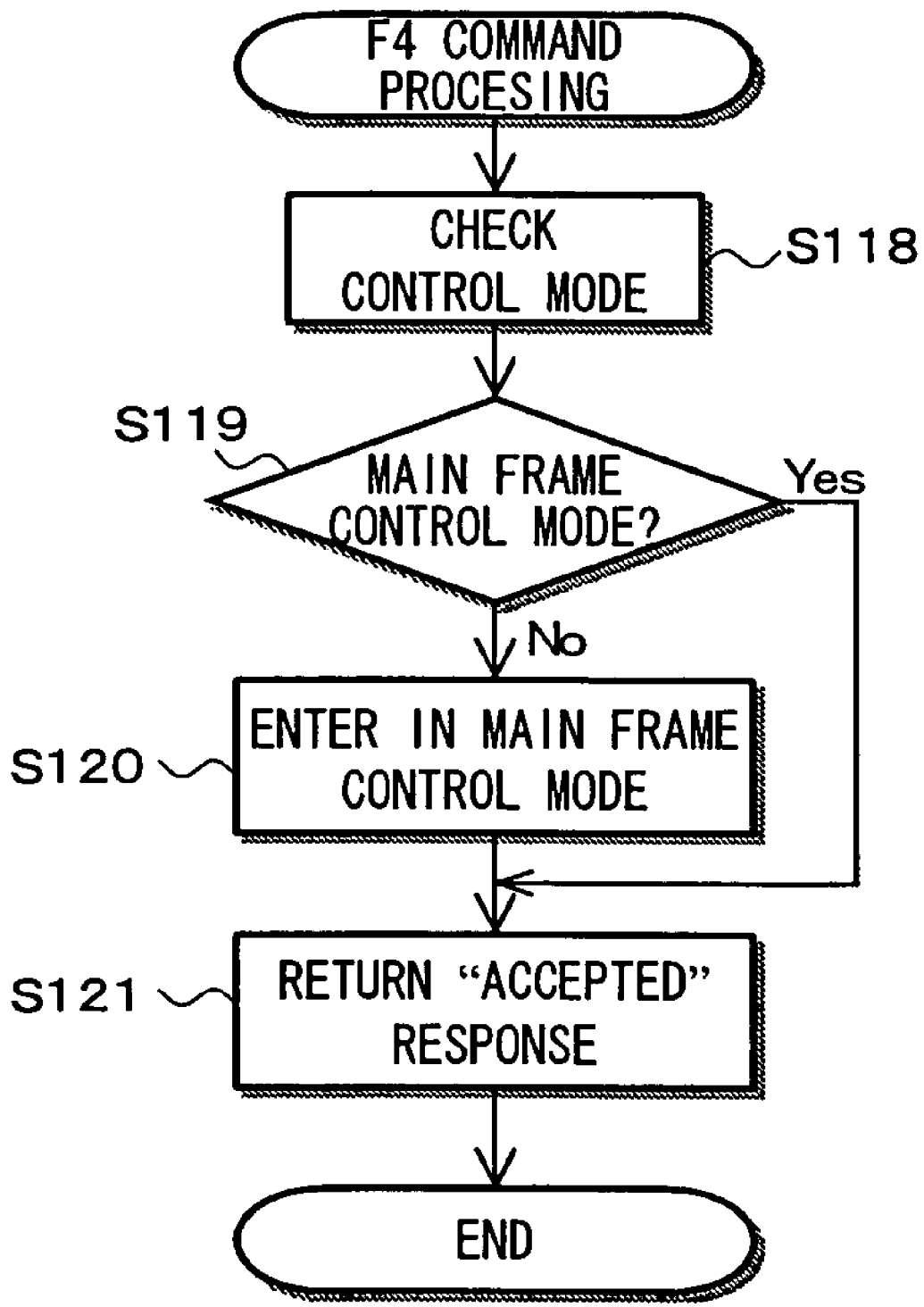

FIG. 12 shows a flowchart describing a processing procedure to be executed by the media player 21 when it receives "F4" command. First, the media player 21 determines the current control mode (step S118). Then, the media player 21 determines whether the main frame control mode has already been entered (step S119). If this mode has not been entered, the "main frame control mode" is entered (step S120). If the main frame control mode has been entered, the mode change does not take place. Next, an ACCEPTED response indicative the acceptance of the command is returned to the command transmitting remote commander 24 (step S121), upon which this processing routines comes to an end in its entirety.

Figure 13:
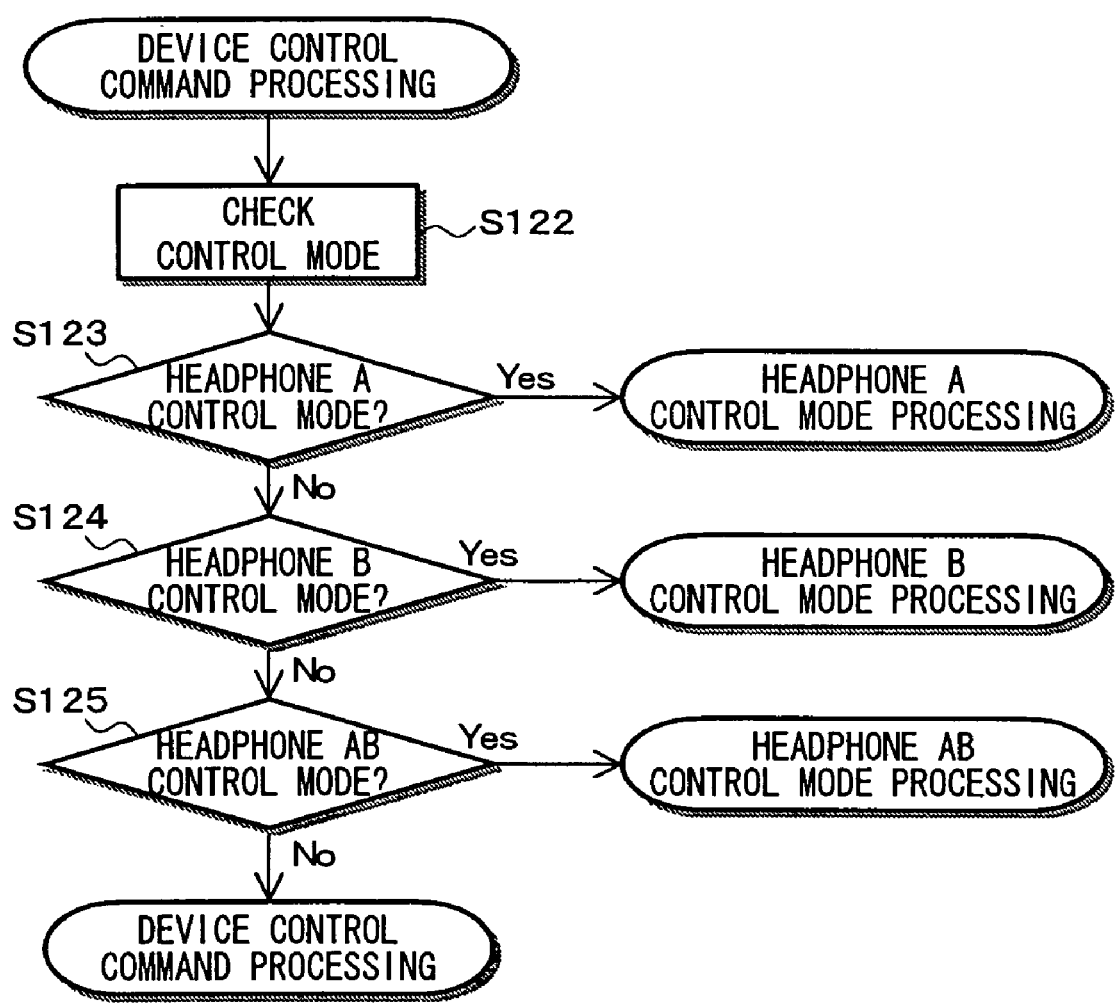

FIG. 13 shows a flowchart describing a device control command processing procedure to be executed by the media player 21. First, the media player 21 checks the current control mode (step S122) whether it is the headphone A control mode (step S123), the headphone B control mode (step S124), or the headphone AB control mode (step S125). If the current mode is any one of these modes, then the procedure goes to the control mode processing shown in FIG. 14, FIG. 15, or FIG. 16 accordingly. If the current mode is none of these control modes, then it is the mode for controlling the main frame of the media player 21 and the procedure goes to the processing shown in FIG. 17.

FIG. 14 shows a flowchart describing a procedure for the media player 21 that is the system controller to process the commands transmitted from the remote commander 24 that is the controller in the headphone A control mode.

The system control block in the media player 21 checks the command received from the remote commander 24 (step S126) to see whether it is listed in the command list (refer to Table 2) of the headphone A22, in other words, whether the received command is supported by the headphone A22 that is a target (step S127).

If the received command is found supported by the headphone A22, then an ACCEPTED response indicative of the acceptance of the command is returned to the command transmitting remote commander 24 (step S128) Then, the command is transferred to the headphone A22 (step S129), upon which this processing routine comes to an end in its entirety. On the other hand, if the received command is found not supported by the headphone A22, then a NOT IMPLEMENTED response is returned to the command transmitting remote commander 24 (step S130), upon which this processing routine comes to an end in its entirety.

Figure 15:
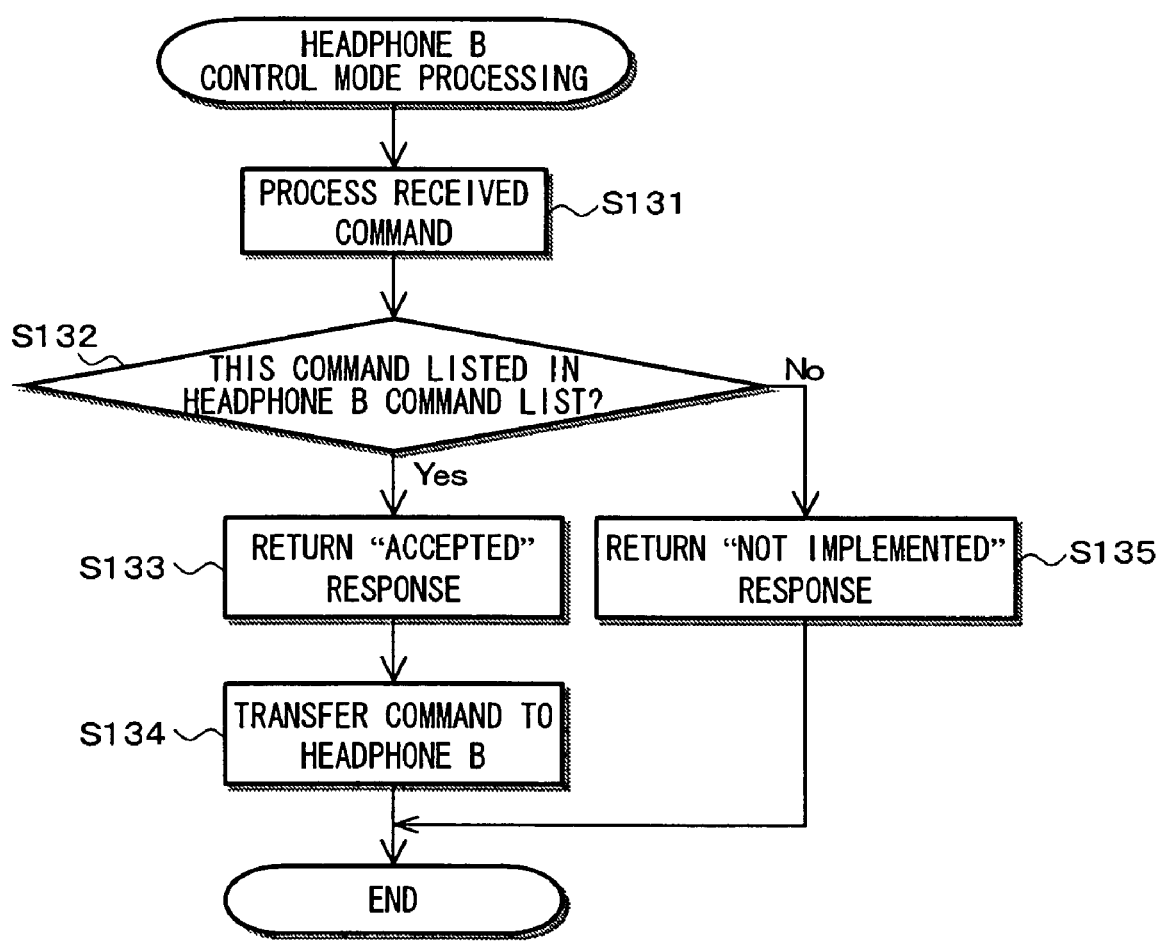

FIG. 15 shows a flowchart describing a procedure for the media player 21 that is the system controller to process the commands transmitted from the remote commander 24 that is the controller in the headphone B control mode.

The system control block in the media player 21 checks the command received from the remote commander 24 (step S131) to see whether it is listed in the command list of the headphone B23, in other words, whether the received command is supported by the headphone B23 that is a target (step S132).

If the received command is found supported by the headphone B23, then an ACCEPTED response indicative of the acceptance of the command is returned to the command transmitting remote commander 24 (step S133). Then, the command is transferred to the headphone B23 (step S133), upon which this processing routine comes to an end in its entirety. On the other hand, if the received command is found not supported by the headphone B23, then a NOT IMPLEMENTED response is returned to the command transmitting remote commander 24 (step S135), upon which this processing routine comes to an end in its entirety.

Figure 16:
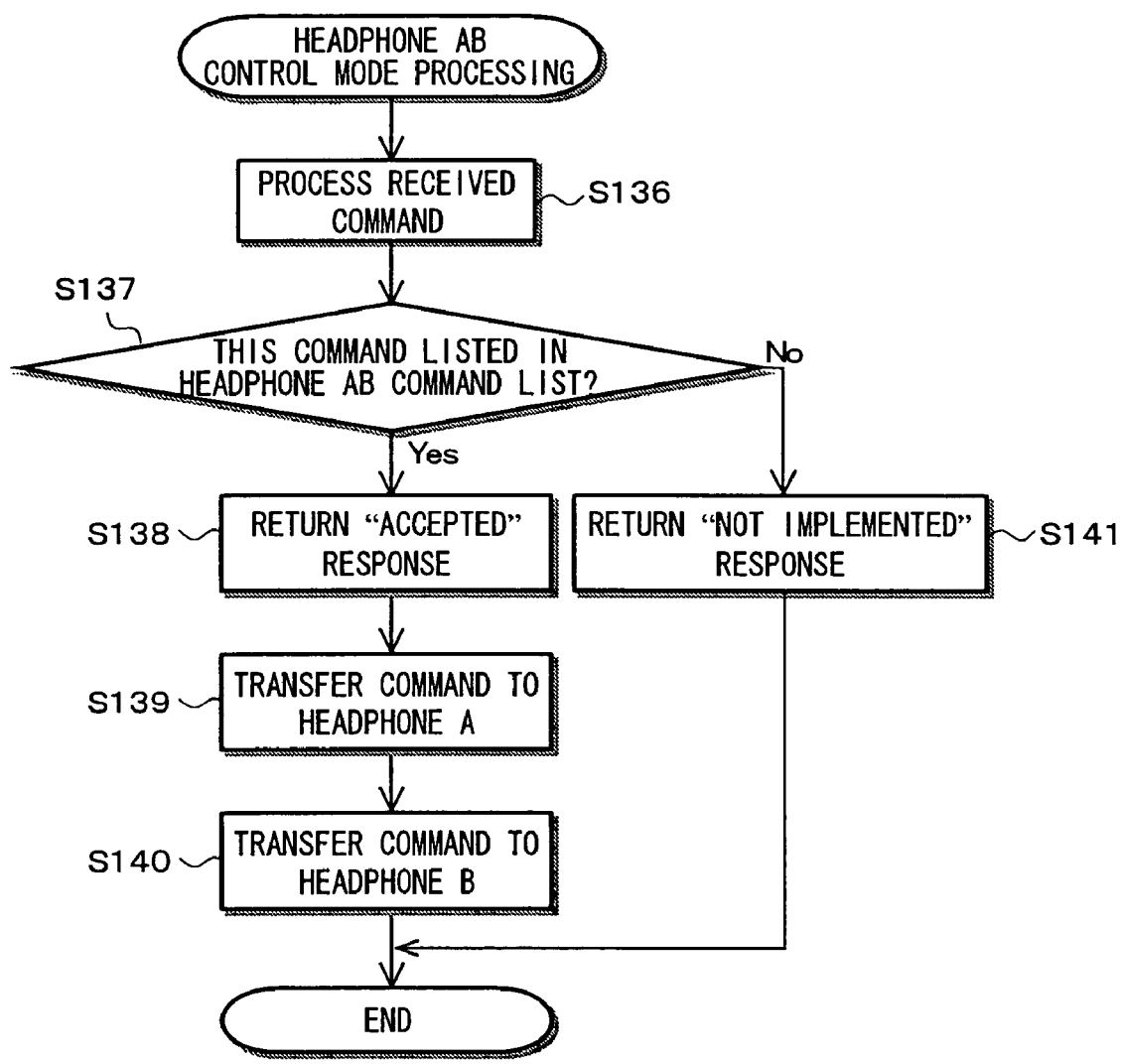

FIG. 16 shows a flowchart describing a procedure for the media player 21 that is the system controller to process the commands transmitted from the remote commander 24 that is the controller in the headphone AB control mode.

The system control block in the media player 21 checks the command received from the remote commander 24 (step S136) to see whether it is listed in the command list of the headphone A 22 or B23 (refer to Table 2), in other words, whether the received command is supported by the headphone A22 that is a target (step S137).

If the received command is found supported by the headphone A22 or B23, then an ACCEPTED response indicative of the acceptance of the command is returned to the command transmitting remote commander 24 (step S138). Then, the command is transferred to the headphones A22 and B23 (steps S139 and S140), upon which this processing routine comes to an end in its entirety. On the other hand, if the received command is found not supported by the headphone A22 or B23, then a NOT IMPLEMENTED response is returned to the command transmitting remote commander 24 (step S141), upon which this processing routine comes to an end in its entirety.

Figure 17:
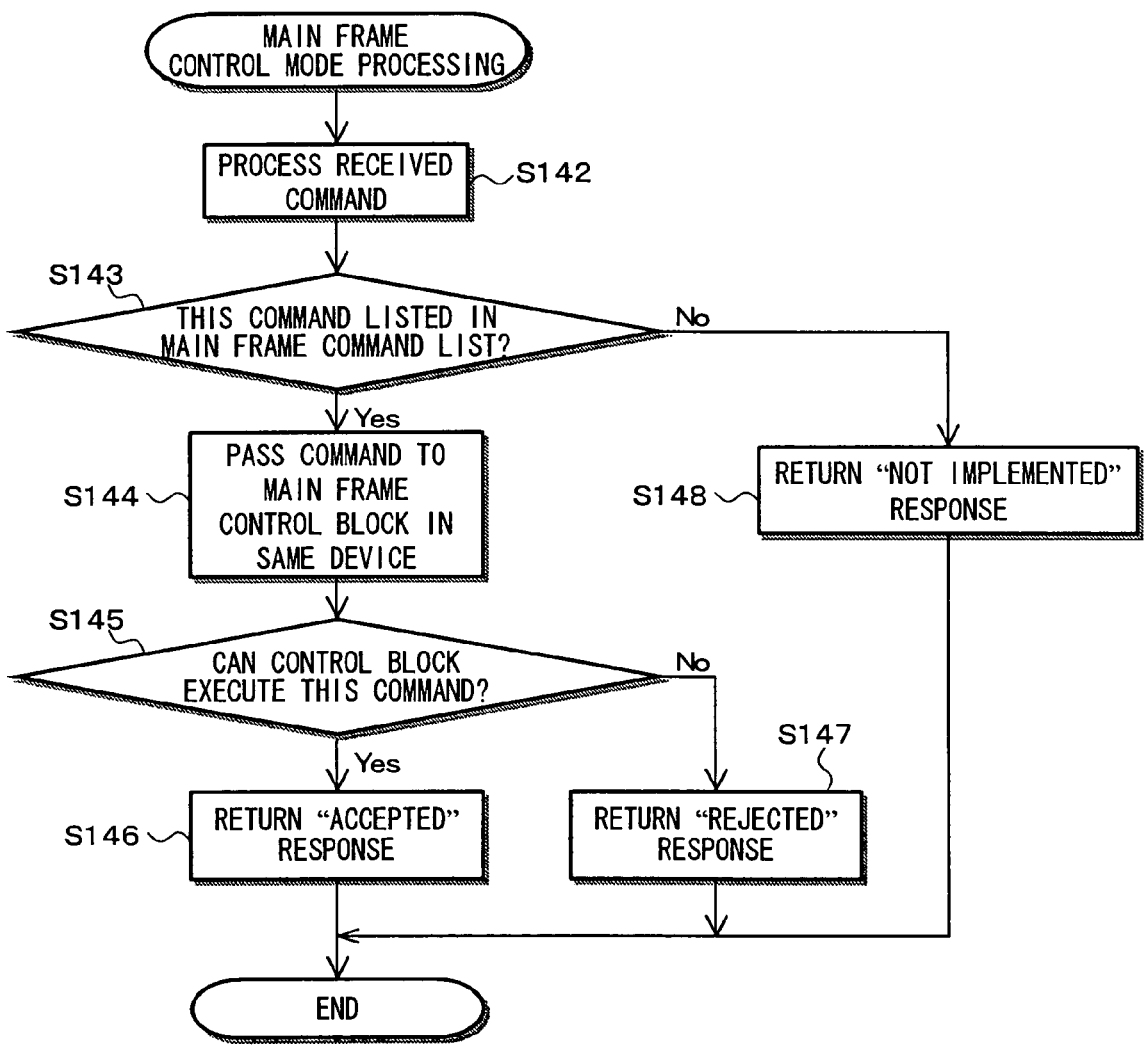

FIG. 17 shows a flowchart describing a procedure for the media player 21 that is the system controller to process the commands received from the remote commander 24 that is the controller in the main frame control mode.

The system control block in the media player 21 checks a command received from the remote commander 24 (step S142) whether it is listed in the list of commands (Table 2) supported by the main frame of the media player 21 (step S143).

If the received command is found supported by the media player 21 itself, the command is passed to the player control block in the media player 21 of the same model (step S144). At this moment, it is checked whether the command can be executed or not due to emergency such as a failure of the player control block (step S145).

If the command is found executable, then an ACCEPTED response is returned to the command transmitting remote commander 24 (step S146), upon which this processing routine comes to an end in its entirety. If the received command is supported but cannot currently be executed, a REJECTED response indicative of the rejection of the command is returned (step S146), upon which this processing routine comes to an end in its entirety. If the received command is found not one supported by the media player 21 itself, a NOT IMPLEMENTED response indicative thereof is returned (step S148), upon which this processing routine comes to an end in its entirety.

The following describes one embodiment of the present invention by use of an example in which the Bluetooth master device that is the system controller processes the transfer of commands between AVRCP controller and AVRCP target in a Bluetooth piconet.

Figure 18:
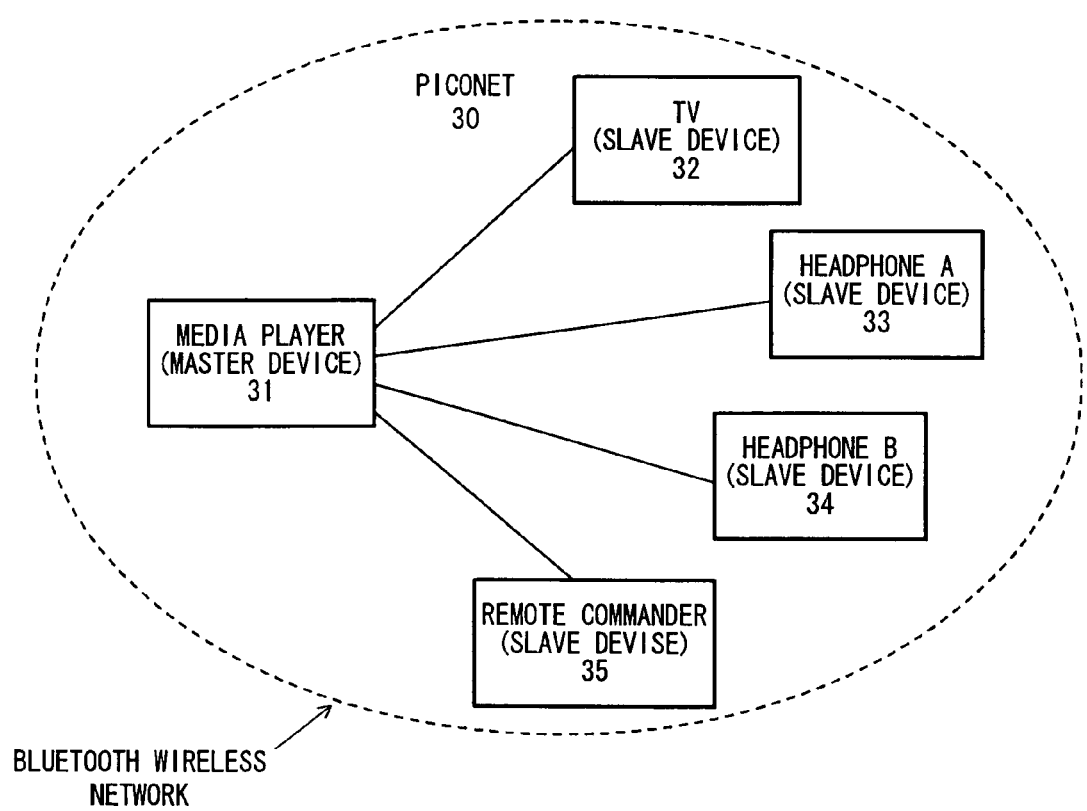
FIG. 18 is a schematic diagram illustrating a configuration in which one master device 31 and four slave devices 32, 33, 34, and 35 exist within one piconet 30 in a Bluetooth wireless network.

FIG. 18 illustrates there are one master device 31 and four slave devices 32, 33, 34, and 35 in one piconet 30 of a Bluetooth wireless network.

As described earlier, the master device 31 is provided with a control function to maintain the order of communication. If a plurality of slaves exist in a same piconet 10, the communication between slaves and master is shared in a time division multiplexing manner between all the slave devices except in the case of broadcast communication. The unit of time division multiplexing is a time interval of 625 microseconds called "time slot."

With respect to the directions of packet transfer between the master and each slave in the same piconet 10, a packet is transferred from maser to slave if its slot number is even and from slave to master if its slot number of odd. Thus, in Bluetooth, packets can be transferred between master and slave, but cannot be directly transferred between slave devices.

In the example shown in FIG. 18, the piconet 30 includes a media player 31 as the master device, a television (TV) tuner 32 as a slave device, headphones 33 and 34 as slave devices, and a remote commander 35 as a slave device. The remote commander 35 remotely controls the media player 31 in play control such as media play, stop, pause, fast forward, and rewind and the TV tuner 32 in tuning, and the headphones 33 and 34 in volume adjustment.

In the piconet 30, one of the Bluetooth application files, AV Remote Control Profile (AVRCP), is implemented. On the AVRCP profile, the remote commander 35 as a slave device has a function of the controller for transmitting commands to other devices, namely targets, in the piconet 30. The media player 31 as the master device has both the functions of the controller for command transmission and the target for command support. The TV tuner 32 and the headphones A33 and B34 as slaves each have an AVRCP target which supports the commands issued by the AVRCP controller.

The media player 31 as the master device of the piconet 30 may operate as the system controller to inquire each slave device in the piconet 30 whether it has the control function and the target function on the control profile AVRCP.

In addition, the media player 31 as the system controller may inquire the slave devices 32, 33, and 34 functioning as AVRCP targets in the piconet 30 to detect the commands supported by these slave devices. The media player 31 generates a command list in the piconet 30. An example of this command list is shown in Table 3 below.

TABLE 3

| Commands supported by media player | Commands supported by TV tuner | Commands supported by headphone A | Commands supported by headphone B |
|---|---|---|---|
| Play | Channel up | Volume up | Volume up |
| Stop | Channel down | Volume down | Volume down |
| Pause | Volume up | Mute | |
| Record | Volume down | | |
| Rewind | Mute | | |
| Fast forward | | | |

Figure 19:
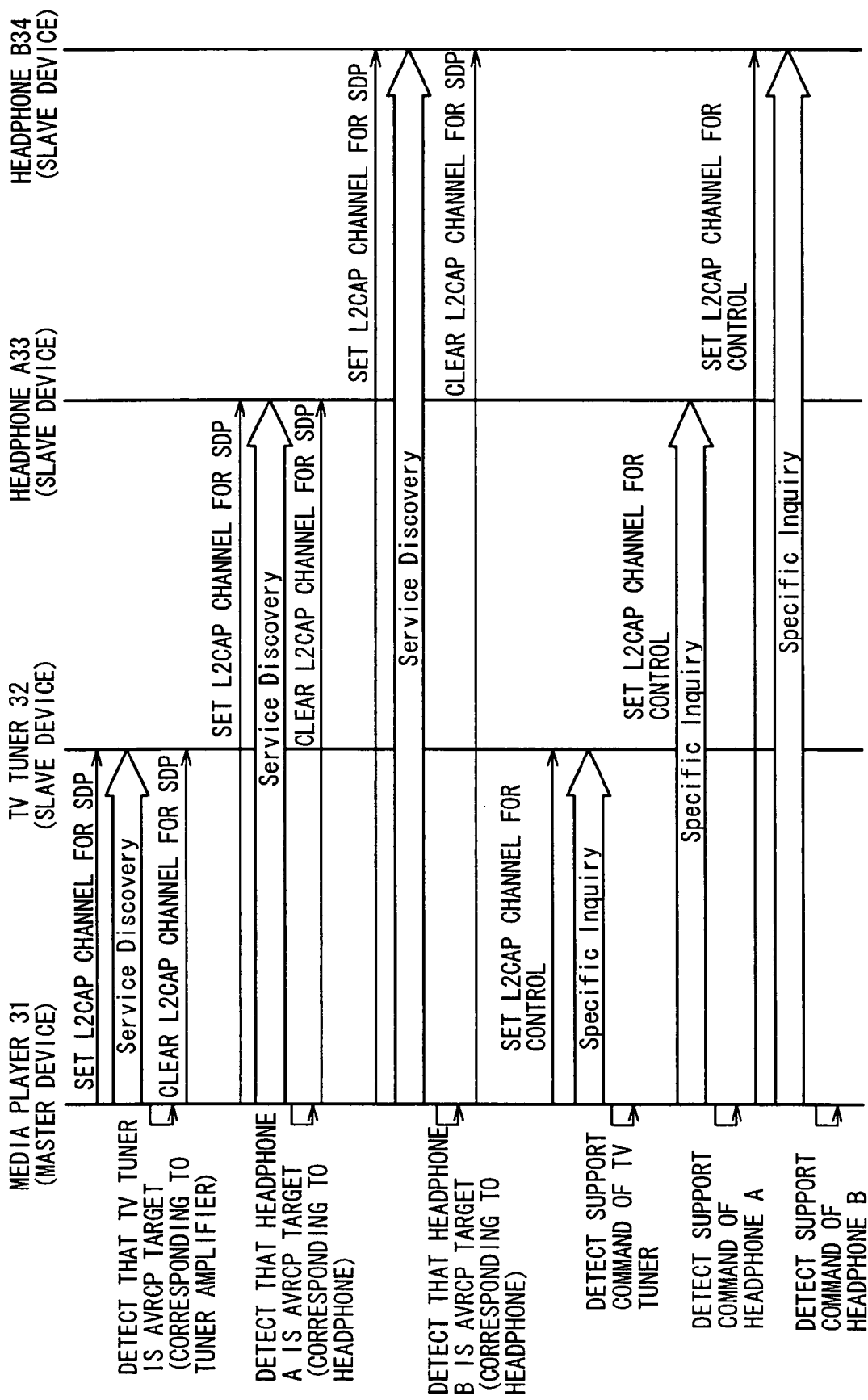
FIG. 19 is a chart illustrating a processing procedure for a media player 31 which is the system controller to inquire slave devices 32 through 34 functioning as AVRCP targets for their functions.

The following describes a processing procedure in which the media player 31 as the system controller inquires the slave devices 32 through 34 functioning as targets on the control profile AVRCP for their functions in the piconet 30 with reference to FIG. 19.

First, the media player 31 which is the master device and the system controller lays the L2CAP channel for Service Discovery Protocol (SDP) with the TV tuner 32 and, on the basis of the Service Discovery procedure, detects that the TV tuner 32 is a target device on the control profile AVRCP and the compatible with the tuner function and amplifier function. Then, the media player 31 clears the L2CAP channel with the TV tuner 32.

Next, the media player 31 lays the L2CAP channel for Service Discovery Protocol (SDP) with the headphone A33 which is another slave device in the piconet 30 and, on the basis of the Service Discovery procedure, detects that the headphone A33 is a target device on the control profile AVRCP and compatible with the headphone function. Then, the media player 31 clears the L2CAP channel with the headphone A33.

Then, the media player 31 lays the L2CAP channel for Service Discovery Protocol (SDP) with the headphone B34 which is another slave device in the piconet 30 and, on the basis of the Service Discovery procedure, detects that the headphone B34 is a target device on the control profile AVRCP and compatible with the headphone function. Then, the media player 31 clears the L2CAP channel with the headphone B34.

Further, the media player 31 as the system controller lays the L2CAP channel for control with the TV tuner 32 as a slave device to inquire, by use of Specific Inquiry, the TV tuner 32 for the commands supported thereby and detect these commands.

Next, the media player 31 lays the L2CAP channel for control with the headphone A33 as a slave device and inquires, by use of Specific Inquiry, the headphone A33 for the commands supported as an AVRCP target thereby and detects them.

Then, the media player 31 lays the L2CAP channel for control with the headphone B34 as a slave device and, by use of Specific Inquiry, inquires the headphone B34 for the commands supported as an AVRCP target thereby and detect them.

Thus, the media player 31 as the system controller may detect the commands supported by the AVRCP target devices in the piconet 30 by use of the ordinary Bluetooth communication and, as a result, generate the command list shown in Table 3 mentioned above.

The following details the processing in which the media player 31 as the system controller inquires each AVRCP target for the commands supported thereby by use of Specific Inquiry. In what follows, it is assumed that the inquiry is directed to the headphone B34 as an AVRCP target.

The media player 31 as the system controller transmits a Specific Inquiry message to the headphone B34 as an AVRCP target to inquire whether the headphone B34 supports command "volume up" or not.

Figures 20, 21, 22:
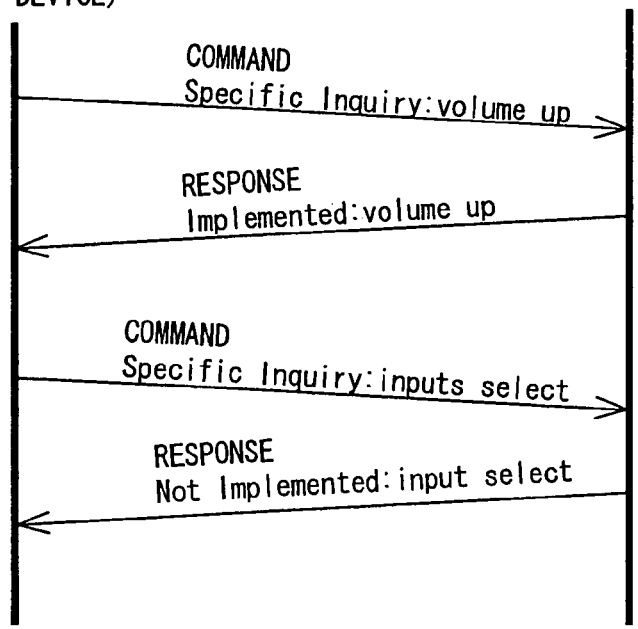
FIG. 20 is a chart illustrating a processing procedure for the media player 31 which is the system controller to inquire each slave device functioning as an AVRCP target for a Specific Inquiry support command.
FIG. 21 is a diagram schematically illustrating a structure of "Inquiry" message frame for the media player 31 which is the system controller to inquire a headphone B34 functioning as an AVRCP target whether it supports command "volume up" or not.
FIG. 22 is a diagram schematically illustrating a structure of "Implemented" message frame for the headphone B34 which is an AVRCP target to return information that it supports command "volume up" to the media player 31 which is the system controller.

For this Specific Inquiry message frame, a PASS THROUGH command may be applied, the frame structure thereof being schematically illustrated in FIG. 21. As shown in the figure, "Specific Inquiry" is specified in Ctype/response field of the message frame. PASS THROUGH is written to the operation code and an operation identifier (here, command "volume up") is written to the operand.

In response, the headphone B34 as an AVRCP target returns Implemented message because it supports the inquired command "volume up."

For this Implemented message frame, a PASS THROUGH command may be applied, the frame structure thereof being schematically illustrated in FIG. 22. As shown in the figure, "Implemented" is specified in Ctype/response field of the message frame. PASS THROUGH is written to the operation code and an operation identifier (here, command "volume up") is written to the operand.

The media player 31 as the system controller transmits Inquiry message to the headphone B34 as an AVRCP target to inquire whether command "input select" is supported thereby.

For this Specific Inquiry message frame, a PASS THROUGH command may be applied, the frame structure thereof being schematically shown in FIG. 23. "Specific Inquiry" is specified in Ctype/response field of the message frame. PASS THROUGH is written to the operation code and an operation identifier (here, command "input select") is written to the operand.

In response, the headphone B34 as an AVRCP target returns Not Implemented message because it does not support the inquired command "input select."

For this Not Implemented message frame, a PASS THROUGH command may be applied, the frame structure thereof being schematically shown in FIG. 24. As shown in the figure, "Not Implemented" is specified in Ctype/response field of the message frame. PASS THROUGH is written to the operation code and an operation identifier (here, command "input select") is written to the operand.

The following describes, with reference to FIG. 25, a processing procedure in which the remote commander 35 functioning as the AVRCP controller transmits a PASS THROUGH command to each AVRCP target via the media player 31 as the system controller for remote control operation.

It should be noted that the media player 31f as the system controller is also the master device in the piconet 30. In the example shown below, the remote commander 35 may be set to the TV tuner control mode by F1 command, the headphone A control mode by F2 command, and the headphone B control mode by F3 command.

The remote commander 35 which is the AVRCP controller is a slave device in the piconet 30 and can communicate only with the media player 31 which is the master device and the system controller. Therefore, to transmit commands to other slave devices 32 through 34 which are AVRCP targets, the remote commander 35 first lays the L2CAP channel for control with the media player 31 which is the master device.

Then, upon establishment of the L2CAP channel for control with the media player 31, the remote commander 35 transmits F1 command to the media player 31 which is the system controller.

In response, the media player 31 interprets the received F1 command to set the control mode of the TV tuner 32.

Further, the remote commander 35 as the AVRCP controller transmits a mute command to the media player 31 which is an AVRCP target.

In response, the media player 31 references the command list such as Table 3 to detect that the received mute command is supported by both the TV tuner 32 and the headphone A33. In this case, the TV tuner control mode is already set by F1 command issued last. Therefore, the media player 31 as the AVRCP controller transfers the mute command only to the TV tuner 32 which is an AVRCP target.

Next, the remote commander 35 as the AVRCP controller transmits a channel up command to the media player 31 which is an AVRCP target.

In response, the media player 31 references the command list as shown in Table 3 mentioned above to detect that the channel up command is supported only by the TV tuner 32. Then, the media player 31 as the AVRCP controller transfers the channel up command to the TV tuner 32 which is an AVRCP target.

Next, the remote commander 35 as the AVRCP controller transmits a play command to the media player 31 which is an AVRCP target.

In response, the media player 31 references the command list as shown in Table 3 mentioned above to detect that the play command is supported only by the media player 31 itself. Therefore, the media player 31 as an AVRCP target executes the play command on its own.

Then, the remote commander 35 transmits F3 command to the media player 31 which is the system controller.

In response, the media player 31 interprets the received F3 command to set the control mode of the headphone B34.

Further, the remote commander 35 as the AVRCP controller transmits a volume up command to the media player 31 which is an AVRCP target.

In response, the media player 31 references the command list as shown in Table 3 mentioned above to detect that the volume up command is supported by the TV tuner 32 and the headphones A33 and B34. In this case, the headphone B control mode is already set by the F3 command issued last. Therefore, the media player 31 as the AVRCP controller transfers the volume up command only to the headphone B34 which is an AVRCP target.

Figures 26, 27, 28:
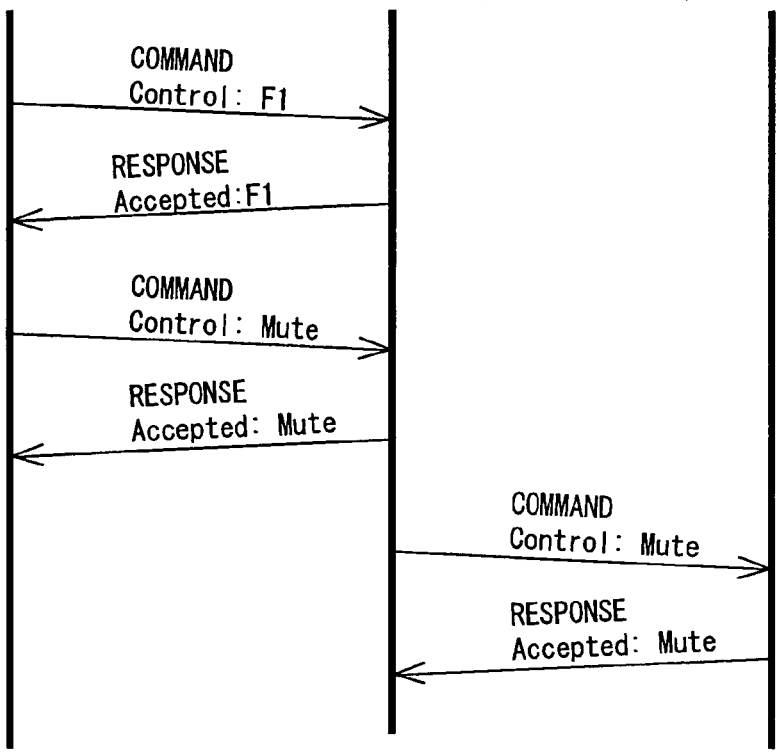
FIG. 26 is a chart illustrating a processing procedure in which the remote commander functioning as the AVRCP controller transmits a PASS THROUGH command to the medial player functioning as the system controller to remotely control other slave devices, which are AVRCP targets.
FIG. 27 is a diagram schematically illustrating a structure of "Control" message frame for the remote commander functioning as the AVRCP controller to transmit an F2 command to the media player 31 functioning as the system controller.
FIG. 28 is a diagram schematically illustrating a structure of "Accepted" message frame for the media player 31 functioning as the system controller to return information that it has accepted the F1 command to the remote commander 35 functioning as the AVRCP controller.

The following details, with reference to FIG. 26, a processing procedure in which the remote commander 35 functioning as the AVRCP controller transmits a PASS THROUGH command to the media player 31 which is the system controller to remotely control other slave devices which are AVRCP targets. In what follows, it is assumed that the remote commander 35 remotely control the TV tuner 32 which is an AVRCP target.

The remote commander 35 which is the AVRCP controller is a slave device in the piconet 30 and therefore can communicate only with the media player 31 which is the master device. Therefore, to set the TV tuner control mode, the remote commander 35 transmits F1 command to the media player 31.

For this F1 command transmission, a PASS THROUGH command may be applied, the frame structure thereof being schematically shown in FIG. 27. As shown in the figure, "Control" is specified in Ctype/response field of the message frame. PASS THROUGH is written to the operation code and an operation identifier (here, command "F1") is written to the operand.

In response, the media player 31 as the system controller accepts the F1 command and sets the TV tuner control mode, returning an Accepted message indicative of the acceptance of the F1 command to the remote commander 35 which is the AVRCP controller.

For the transmission of the Accepted message, a PASS THROUGH command may be applied, the frame structure thereof being schematically shown in FIG. 28. As shown in the figure, "Accepted" is specified in Ctype/response field of the message frame. PASS THROUGH is written to the operation code and an operation identifier (here, command "F1") is written to the operand.

Also, the remote controller 35 as a slave device and the AVRCP controller transmits a mute command to the media player 31 which is the master device and an AVRCP target.

For the transmission of this mute command, a PASS THROUGH command may be applied, the frame structure thereof being schematically shown in FIG. 29. As shown in the figure, "Control" is specified in Ctype/response field of the message frame. PASS THROUGH is written to the operation code and an operation identifier (here, command "mute") is written to the operand.

In response, the media player 31 as the system controller accepts the mute command and references the command list as shown in Table 3 mentioned above to detect that the received mute command is supported by the AVRCP target in the piconet 30, returning an Accepted message indicative of the acceptance of the mute command to the remote commander 35 which is the AVRCP controller.

For the transmission of this Accepted message, a PASS THROUGH command may be applied, the frame structure thereof being schematically shown on FIG. 30. As shown in the figure, "Accepted" is specified in Ctype/response field of the message frame. PASS THROUGH is written to the operation code and an operation identifier (here, command "mute") is written to the operand.

In the piconet 30, the TV tuner 32 and the headphone A33 which are AVRCP targets support the mute command. In this case, the TV tuner control mode is already set by the F1 command issued last. Therefore, the media player 31 as the system controller transfers, as the AVRCP controller, the mute command to the TV tuner 32 which is an AVRCP target.

For the transmission of this mute command, a PASS THROUGH command may be applied, the frame structure thereof being schematically shown in FIG. 31. As shown in the figure, "Control" is specified in Ctype/response field of the message frame. PASS THROUGH is written to the operation code and an operation identifier (here, command "mute") is written to the operand.

Upon reception of the mute command supported by itself, the media player 31 as an AVRCP target returns an Accepted message indicative of the acceptance of the mute command to the media player 31 which is the AVRCP controller. In the piconet 30, the media player 31 is the master device and the TV tuner 32 is a slave device, so that communication between them is enabled.

For the transmission of this Accepted message, a PASS THROUGH command may be applied, the frame structure thereof being schematically shown in FIG. 32. As shown in the figure, "Accepted" is specified in Ctype/response field of the message frame. PASS THROUGH is written to the operation code and an operation identifier (here, command "mute") is written to the operand.

Supplement:

The present invention has been described in detail with reference to preferred embodiments. While the preferred embodiments of the present invention have been described using specific terms, such description is for illustrative purposes only, and it is to be understood that changes and variations may be made without departing from the spirit or scope of the invention.

Herein, Bluetooth is used as the wireless communication technology for example to perform remote control operations between the slave devices in a same piconet. The present invention is not restricted to this wireless connection based on the Bluetooth technology. For example, the present invention is also applicable to wireless communication technologies in which a master devices and its slave devices are defined in a same piconet and data and commands are exchanged between these master and slave devices.

Essentially, the present invention is disclosed only in the form of examples and therefore the contents hereof should not be interpreted in a restrictive manner. In order to fully determine the spirit of the present invention, the claims appended hereto should be referenced.

INDUSTRIAL APPLICABILITY

As described and according to the invention, an excellent wireless communication apparatus, an excellent wireless communication method, an excellent storage medium, and an excellent program are provided for preferably exchanging the commands for device operation between devices connected in a wireless manner.

As described and according to the invention, an excellent wireless communication method, an excellent storage medium, and an excellent program are provided for preferably exchanging the commands for device operation between slave devices in a piconet constituted by one master device and a plurality of slave devices as with Bluetooth.

As described and according to the invention, an excellent wireless communication method, an excellent storage medium, and an excellent program are provided for preferably exchanging the commands for device operation between the two or more slave devices which can be connected directly only to the master device in a piconet.

As described and according to the invention, an excellent wireless communication method, an excellent storage medium, and an excellent program are provided which are capable of performing remote control between the slave devices in a same piconet by use of the Bluetooth remote control profile.

As described and according to the invention, an excellent wireless communication method, an excellent storage medium, and an excellent program are provided which are capable of realizing controlling a slave device by another slave device via the master device by use of the conventional Bluetooth control profile such as AV Remote Control Profile (AVRCP).

As described and according to the invention, by making the most of the characteristics of the master and slave roles in Bluetooth wireless connection, the master device centrally manages the controls functions supported by each slave device in a piconet, so that each slave device can perform control between the slave devices in the piconet without being aware of the other slave devices except the master device.

The application in the master device called a system controller manages the functions of the slave devices in a piconet, so that the control profile implemented by each Bluetooth device may remain conventional. Namely, there is no need for newly creating a control profile or change the design thereof to embody the present invention, so that existing Bluetooth devices may be used as slave devices without change.

The invention claimed is:

1. A wireless communication control apparatus for controlling, in a communication cell of a type constituted by one master device and a plurality of slave devices in which each of said plurality of slave devices is communicable only with said master device, a command exchange operation between the devices, comprising:
controller/target inquiry means for inquiring each master and slave device in said communication cell whether each master and slave device operates as a controller or a target;
support command inquiry means for inquiring each master and slave device having a target function for a command supported thereby;
support command managing means for managing the commands supported by each target device;
command receiving means for receiving a command from the controller in said communication cell; and
command processing means for processing the received command,
wherein said command processing means inquires said support command managing means to transfer the received command to the target which support said command.

2. A wireless communication control apparatus for controlling, in a communication cell of a type constituted by one master device and a plurality of slave devices in which each of said plurality of slave devices is communicable only with said master device, a command exchange operation between the devices, comprising:
controller/target inquiry means for inquiring each master and slave device in said communication cell whether each master and slave device operates as a controller or a target;
support command inquiry means for inquiring each master and slave device having a target function for a command supported thereby;
support command managing means for managing the commands supported by each target device;
command receiving means for receiving a command from the controller in said communication cell; and
command processing means for processing the received command,
wherein if there are at least two target devices which support the received command in said communication cell, said controller device has a function for specifying a particular target device and
wherein said command processing means transfers said command to the specified target device in accordance with the specification of the controller device from which said command is transmitted.

3. A wireless communication control apparatus for controlling, in a communication cell of a type constituted by one master device and a plurality of slave devices in which each of said plurality of slave devices is communicable only with said master device, a command exchange operation between the devices, comprising:
controller/target inquiry means for inquiring each master and slave device in said communication cell whether each master and slave device operates as a controller or a target;
support command inquiry means for inquiring each master and slave device having a target function for a command supported thereby;
support command managing means for managing the commands supported by each target device;
command receiving means for receiving a command from the controller in said communication cell;
command processing means for processing the received command;
reception log storage means for storing a reception log indicative of command reception; and
target identifying means for identifying a target which executes the received command on the basis of the newest log stored in said reception log storage means.

4. A wireless communication control apparatus for controlling, in a communication cell of a type constituted by one master device and a plurality of slave devices in which each of said plurality of slave devices is communicable only with said master device, a command exchange operation between the devices, comprising:
controller/target inquiry means for inquiring each master and slave device in said communication cell whether each master and slave device operates as a controller or a target;
support command inquiry means for inquiring each master and slave device having a target function for a command supported thereby;
support command managing means for managing the commands supported by each target device;
command receiving means for receiving a command from the controller in said communication cell; and
command processing means for processing the received command,
wherein, if there are at least two target devices which support the received command in said communication cell, said command processing means transfers the received command to all target devices which support said command.

5. A wireless communication control method for controlling, in a communication cell of a type constituted by one master device and a plurality of slave devices in which each of said plurality of slave devices is communicable only with said master device, a command exchange operation between the devices, comprising the steps of:
inquiring each master and slave device in said communication cell whether each master and slave device operates as a controller or a target;
inquiring each master and slave device having a target function for a command supported thereby;
managing the commands supported by each target device;
receiving a command from the controller in said communication cell; and
processing the received command,
wherein said command processing step inquires each target in said communication cell for supported commands to transfer the received command to the target which supports said command.

6. A wireless communication control method for controlling, in a communication cell of a type constituted by one master device and a plurality of slave devices in which each of said plurality of slave devices is communicable only with said master device, a command exchange operation between the devices, comprising the steps of:
inquiring each master and slave device in said communication cell whether each master and slave device operates as a controller or a target;
inquiring each master and slave device having a target function for a command supported thereby;

managing the commands supported by each target device;
receiving a command from the controller in said communication cell; and
processing the received command,
wherein if there are at least two target devices which support the received command in said communication cell, specifying a particular target device from said controller device,
said command processing step transferring said received command to the target device specified by the controller device from which said command is transmitted.

7. A wireless communication control method for controlling, in a communication cell of a type constituted by one master device and a plurality of slave devices in which each of said plurality of slave devices is communicable only with said master device, a command exchange operation between the devices, comprising the steps of:
inquiring each master and slave device in said communication cell whether each master and slave device operates as a controller or a target;
inquiring each master and slave device having a target function for a command supported thereby;
managing the commands supported by each target device;
receiving a command from the controller in said communication cell;
processing the received command;
storing a reception log indicative of command reception; and
identifying a target which executes the received command on the basis of the newest log stored in said reception log storage step.

8. A wireless communication control method for controlling, in a communication cell of a type constituted by one master device and a plurality of slave devices in which each of said plurality of slave devices is communicable only with said master device, a command exchange operation between the devices, comprising the steps of:
inquiring each device in said communication cell whether each device operates as a controller or a target;
inquiring each device having a target function for a command supported thereby;
managing the commands supported by each target device;
receiving a command from the controller in said communication cell; and
processing the received command,
wherein, if there are at least two target devices which support the received command in said communication cell, said command processing step transfers said received command to all target devices which support said received command.

9. A wireless communication control apparatus for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, the wireless communication control apparatus comprising:
connecting means for establishing Bluetooth communication in said piconet;
controller/target function grasping means for grasping a slave device which functions as a target and/or a controller;
support command grasping means for managing the commands supported by each target in said piconet;
said wireless communication control apparatus operates as said master device for controlling a communication condition in said piconet, the wireless communication control apparatus further comprising command receiving means for receiving a command, which is connected with the slave device operating as the controller in said piconet; and
command processing means for processing the received command;
wherein said command processing means transfers the received command to the target which support said received command.

10. A wireless communication control apparatus for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, the wireless communication control apparatus comprising:
connecting means for establishing Bluetooth communication in said piconet;
controller/target function grasping means for grasping a slave device which functions as a target and/or a controller;
support command grasping means for managing the commands supported by each target in said piconet;
said wireless communication control apparatus operates as said master device for controlling a communication condition in said piconet, the wireless communication control apparatus further comprising command receiving means for receiving a command, which is connected with the slave device operating as the controller in said piconet; and
command processing means for processing the received command,
wherein, if there are at least two target devices which support the received command in said piconet, said controller device has a function for specifying a particular target device, and
said command processing means transfers said command to the specified target device in accordance with a specification of the controller device from which said command is transmitted.

11. A wireless communication control apparatus for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, the wireless communication control apparatus comprising:
connecting means for establishing Bluetooth communication in said piconet; controller/target function grasping means for grasping a slave device which functions as a target and/or a controller;
support command grasping means for managing the commands supported by each target in said piconet;
said wireless communication control apparatus operates as said master device for controlling a communication condition in said piconet, the wireless communication control apparatus further comprising command receiving means for receiving a command, which is connected with the slave device operating as the controller in said piconet;
command processing means for processing the received command;

reception log storage means for storing a reception log indicative of command reception; and target identifying means for identifying a target which executes the received command on the basis of the newest log stored in said reception log storage means.

12. A wireless communication control apparatus for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, the wireless communication control apparatus comprising;

connecting means for establishing Bluetooth communication in said piconet;

controller/target function grasping means for grasping a slave device which functions as a target and/or a controller;

support command grasping means for managing the commands supported by each target in said piconet;

said wireless communication control apparatus operates as said master device for controlling a communication condition in said piconet, the wireless communication control apparatus further comprising command receiving means for receiving a command, which is connected with the slave device operating as the controller in said piconet; and command processing means for processing the received command, wherein, if there are at least two target devices which support the received command in said piconet, said command processing means transfers the received command to all target devices which support said command.

13. A wireless communication control method for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, wherein said wireless communication control method is realized on said master device which controls a communication condition in said piconet, the method comprising the steps of:

establishing Bluetooth communication in said piconet;

grasping a slave device which functions as at least one of a target and a controller in said piconet;

managing the commands supported by each target in said piconet;

receiving a command, which is connected with the slave device operating as the controller in said piconet; and processing the received command, wherein said command processing step transfers the received command to the target which supports said received command.

14. A wireless communication control method for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, said wireless communication control method is realized on said master device which controls a communication condition in said piconet, the method comprising the steps of:

establishing Bluetooth communication in said piconet;

grasping a slave device which functions as a target and/or a controller in said piconet;

managing the commands supported by each target in said piconet;

receiving a command, which is connected with the slave device operating as the controller in said piconet; and processing the received command, wherein, if there are at least two target devices which support the received command in said piconet, the method further comprising the step of;

specifying a particular target device, said command processing step transfers said command to the specified target device in accordance with a specification of the controller device from which said command is transmitted.

15. A wireless communication control method for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, said wireless communication control method is realized on said master device which controls a communication condition in said piconet, the method comprising the steps of:

establishing Bluetooth communication in said piconet;

grasping a slave device which functions as a target and/or a controller in said piconet;

managing the commands supported by each target in said piconet;

receiving a command, which is connected with the slave device operating as the controller in said piconet;

processing the received command;

storing a reception log indicative of command reception; and identifying a target which executes the received command on the basis of the newest log stored in said reception log storage step.

16. A wireless communication control method for controlling, in a piconet of a Bluetooth wireless network constituted by one master device and a plurality of slave devices, at least one slave device in said piconet having a controller function for issuing commands and at least one slave device having a target function for supporting commands, said master device having both controller and target functions, said wireless communication control method is realized on said master device which controls a communication condition in said piconet, the method comprising the steps of:

establishing Bluetooth communication in said piconet;

grasping a slave device which functions as a target and/or a controller in said piconet;

managing the commands supported by each target in said piconet;

receiving a command, which is connected with the slave device operating as the controller in said piconet; and processing the received command, wherein, if there are at least two target devices which support the received command in said communication cell, said command processing step transfers the received command to all target devices which support said command.

* * * * *

UNITED STATES PATENT AND TRADEMARK OFFICE
CERTIFICATE OF CORRECTION

| | | |
|---|---|---|
| PATENT NO. | : 7,149,475 B2 | Page 1 of 1 |
| APPLICATION NO. | : 10/362481 | |
| DATED | : December 12, 2006 | |
| INVENTOR(S) | : Kawamura | |

It is certified that error appears in the above-identified patent and that said Letters Patent is hereby corrected as shown below:

On the title page, item (57), line 7, "control" should read --controls--.

In claim 1, column 27, line 26, "support" should read --supports--.

In claim 12, column 31, line 14, "comprising;" should read --comprising:--.

Signed and Sealed this

Twenty-second Day of May, 2007

JON W. DUDAS
*Director of the United States Patent and Trademark Office*